Dec. 23, 1941.   J. L. DRAKE ET AL   2,267,604
SHEET GLASS FORMING MACHINE
Filed July 17, 1937   18 Sheets-Sheet 1
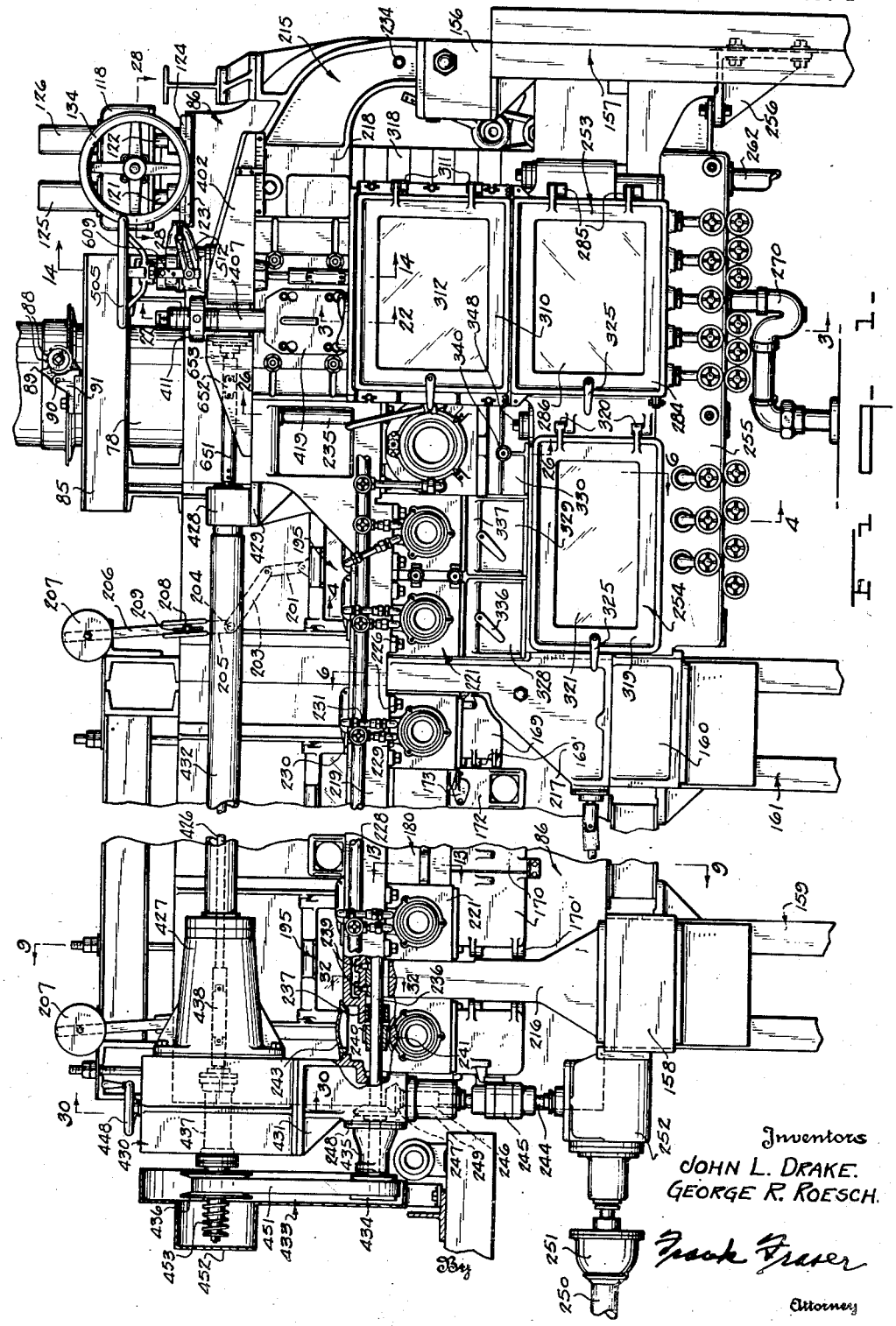
Inventors
JOHN L. DRAKE.
GEORGE R. ROESCH.
By Frank Fraser
Attorney

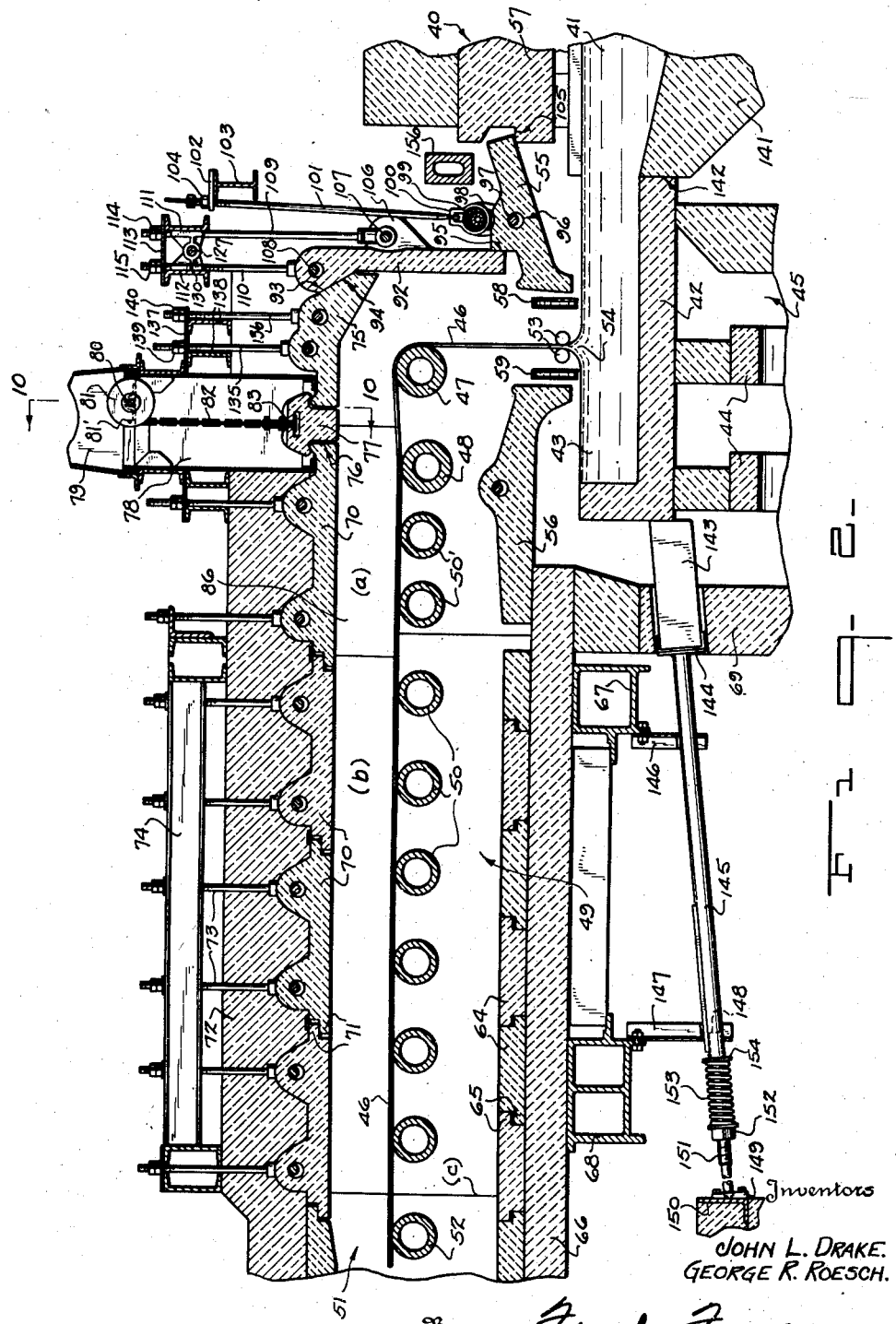

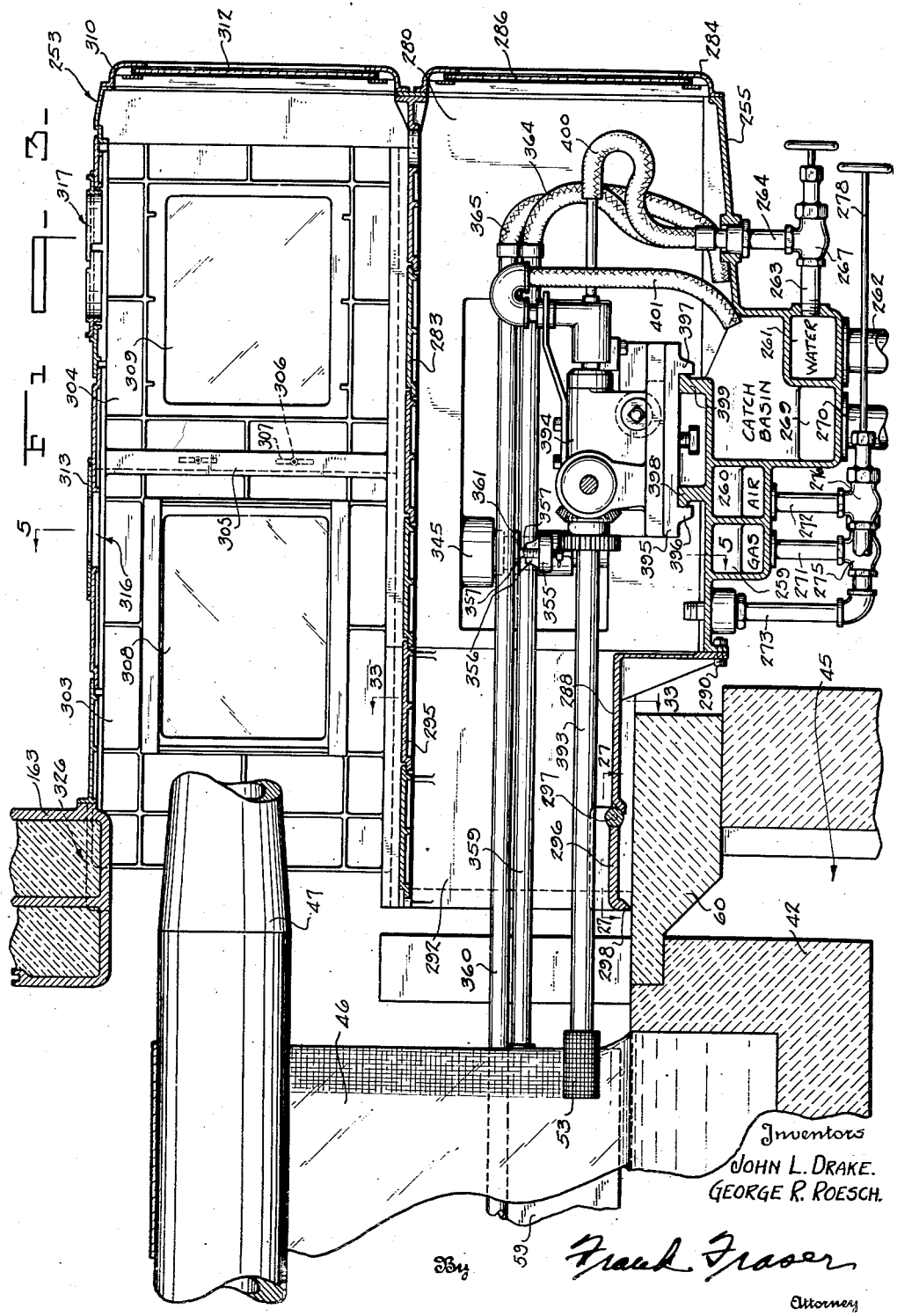

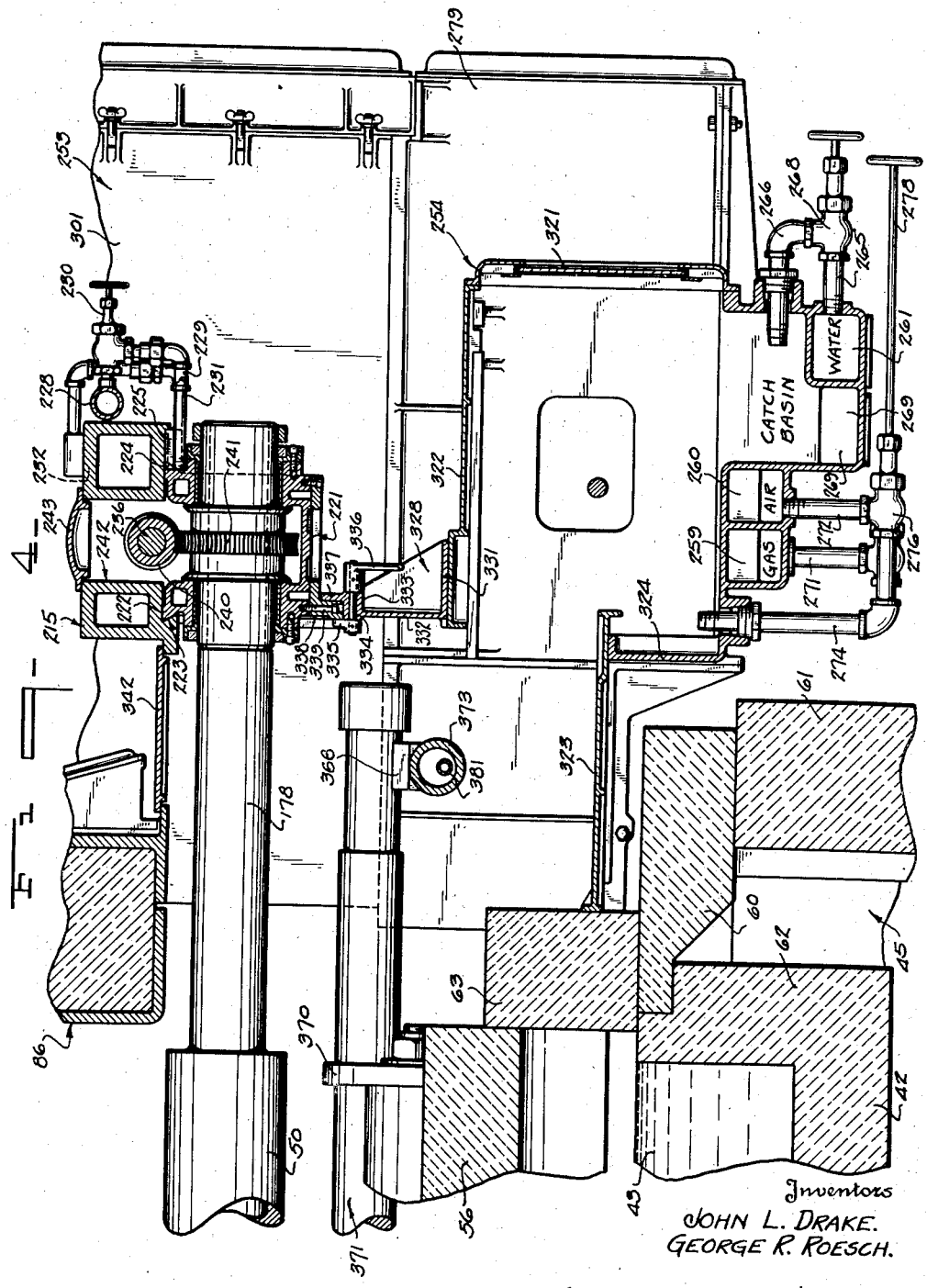

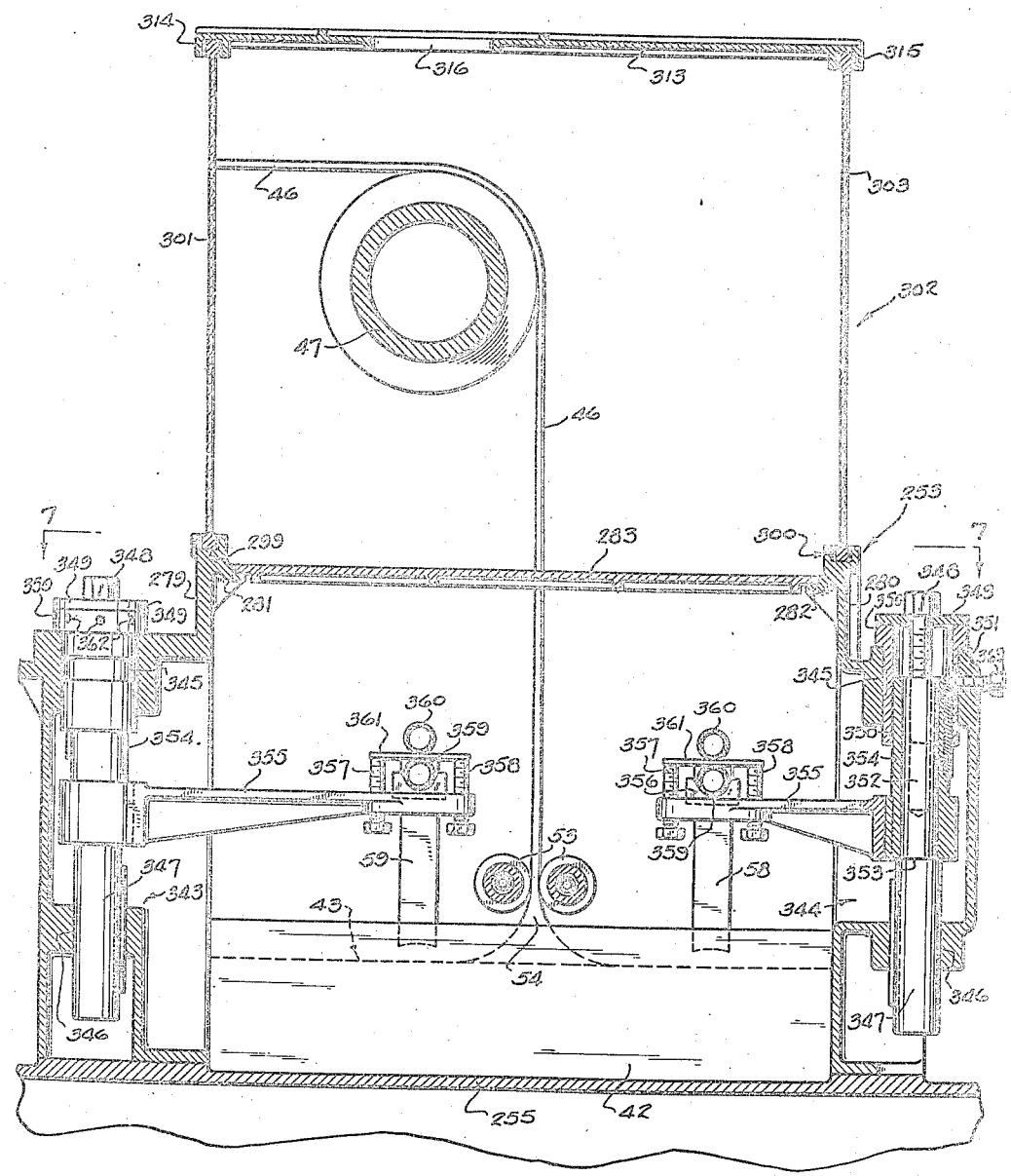

Dec. 23, 1941.     J. L. DRAKE ET AL     2,267,604
SHEET GLASS FORMING MACHINE
Filed July 17, 1937     18 Sheets-Sheet 6
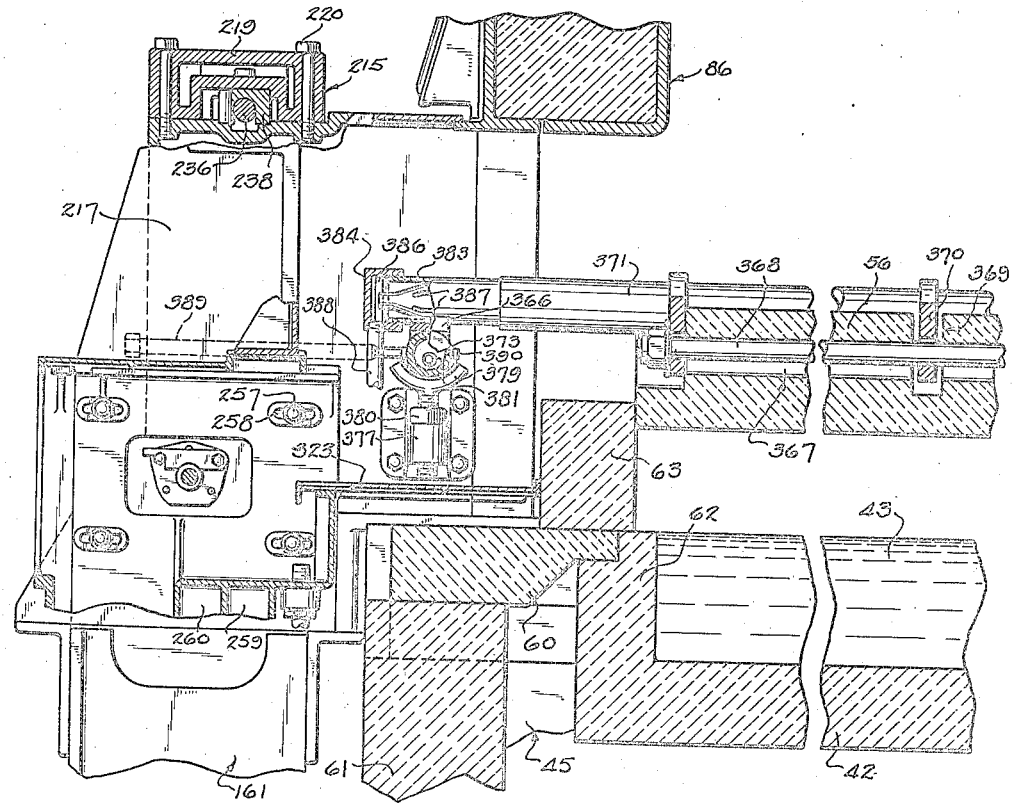
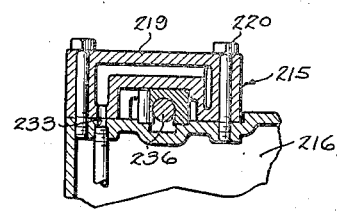
Inventors
JOHN L. DRAKE.
GEORGE R. ROESCH.
By Frank Fraser
Attorney

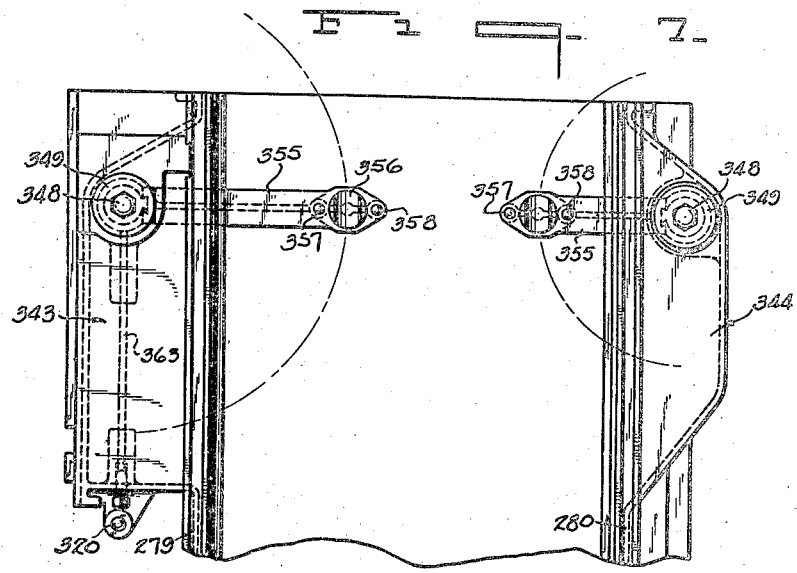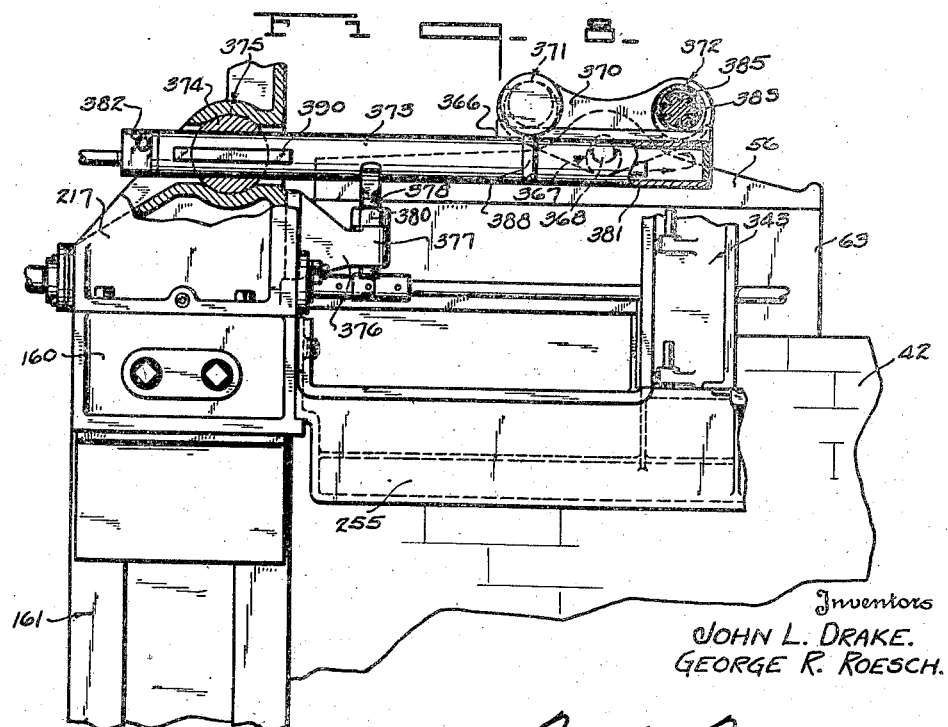

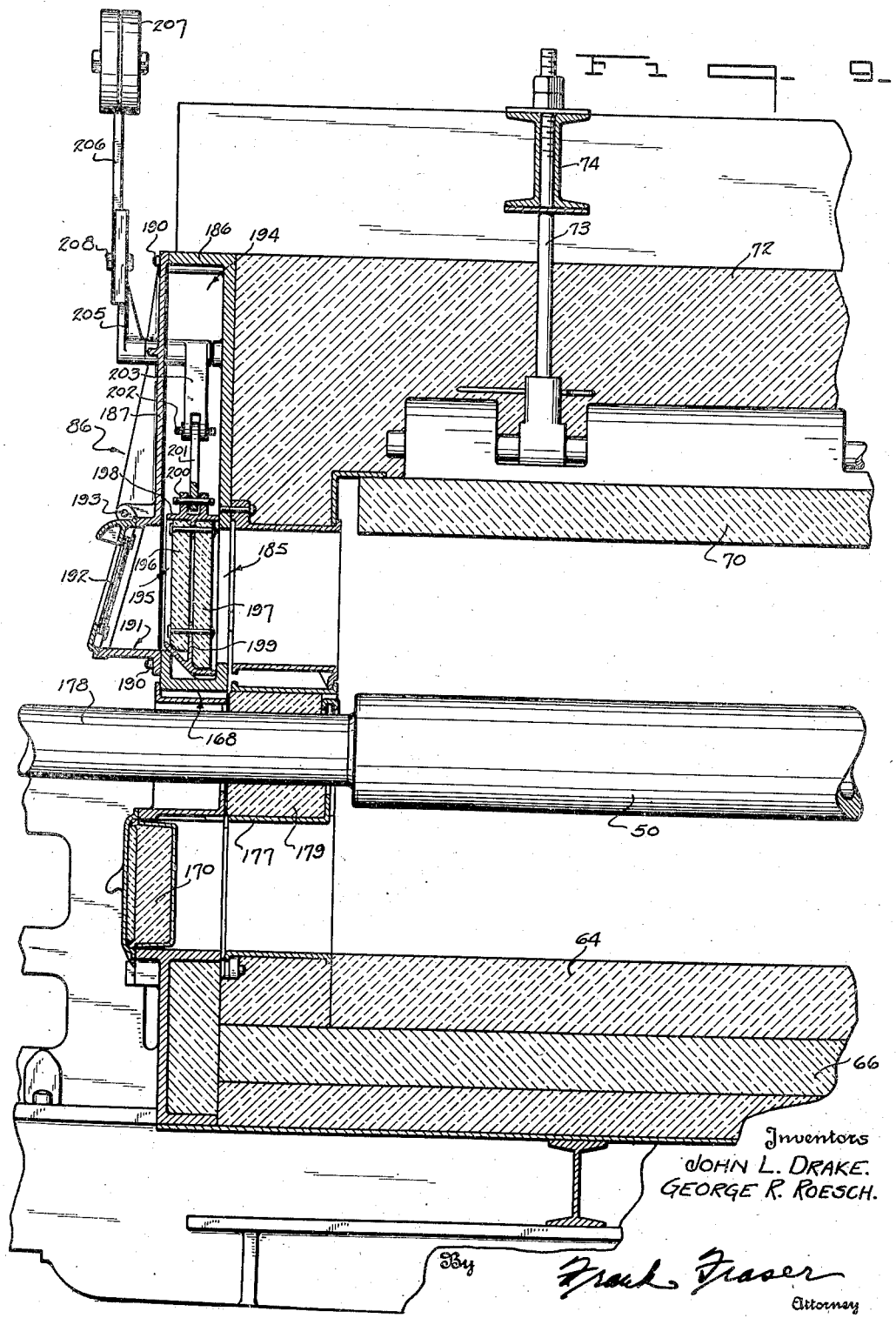

Dec. 23, 1941.   J. L. DRAKE ET AL   2,267,604
SHEET GLASS FORMING MACHINE
Filed July 17, 1937   18 Sheets-Sheet 9
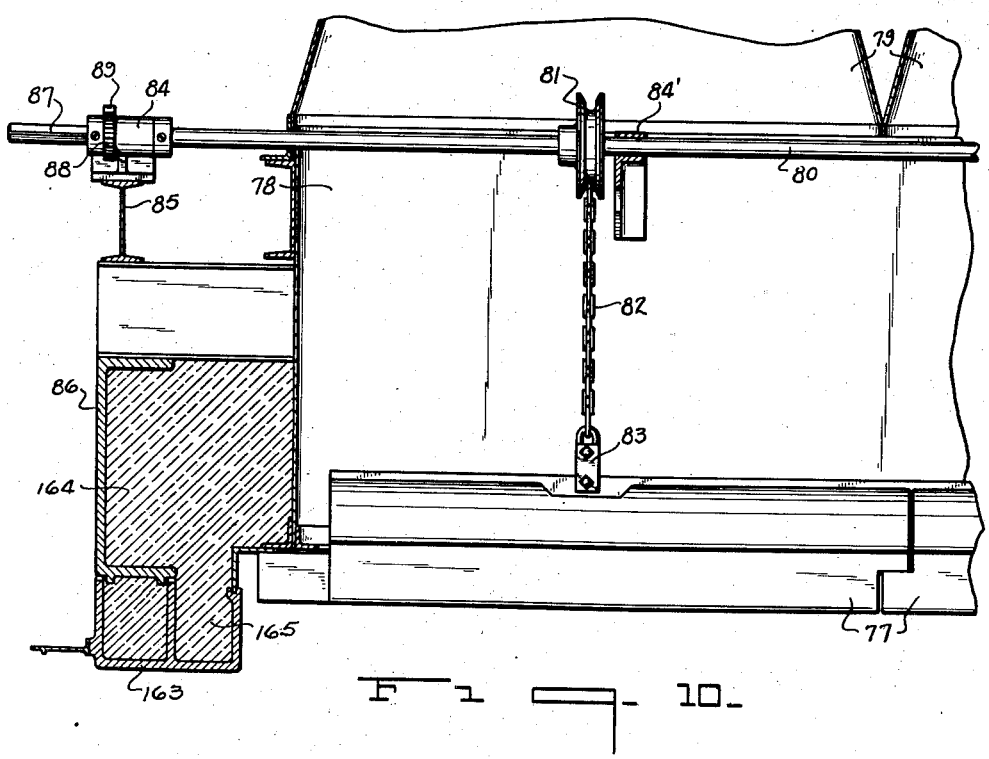
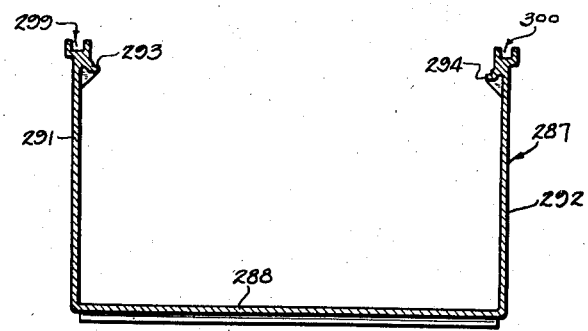
Inventors
JOHN L. DRAKE.
GEORGE R. ROESCH.
By Frank Fraser
Attorney Dec. 23, 1941.  J. L. DRAKE ET AL  2,267,604

SHEET GLASS FORMING MACHINE

Filed July 17, 1937   18 Sheets-Sheet 10

Inventors
JOHN L. DRAKE.
GEORGE R. ROESCH.

By Frank Fraser
Attorney

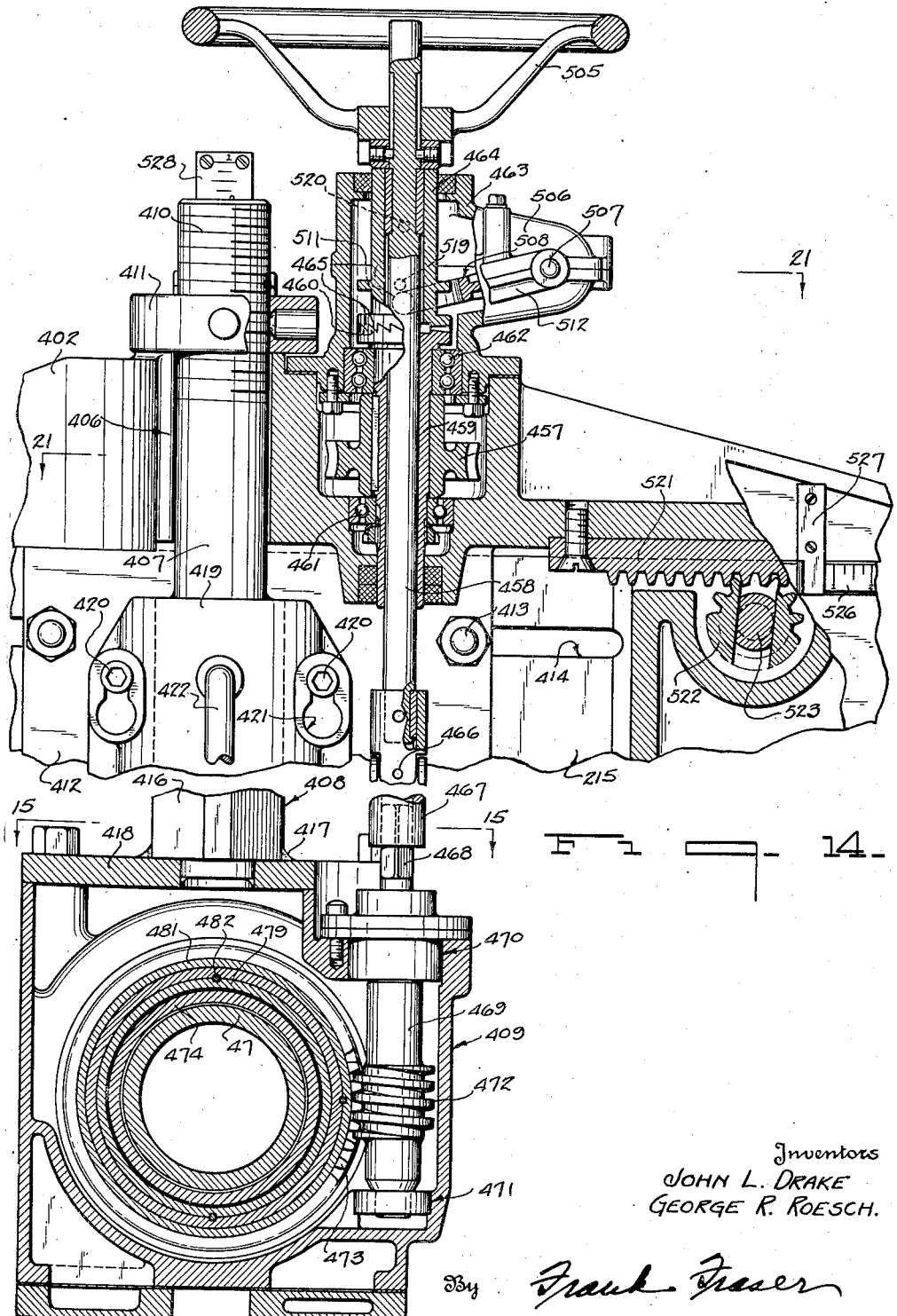

Dec. 23, 1941.  J. L. DRAKE ET AL  2,267,604
SHEET GLASS FORMING MACHINE
Filed July 17, 1937   18 Sheets-Sheet 12
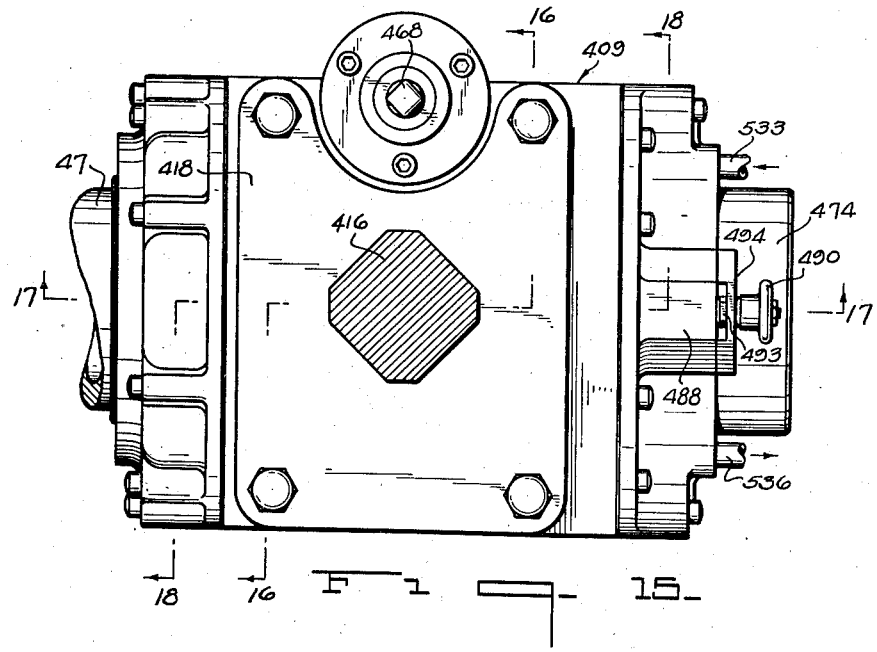
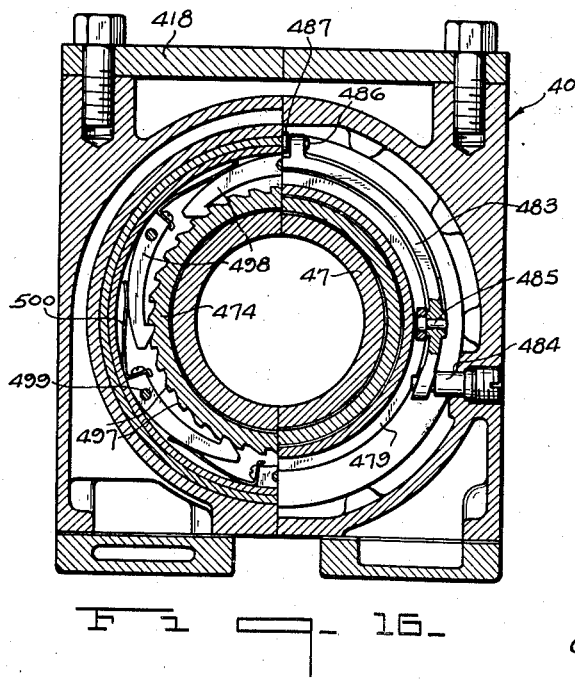
Inventors
JOHN L. DRAKE.
GEORGE R. ROESCH.
By Frank Fraser
Attorney Dec. 23, 1941.  J. L. DRAKE ET AL  2,267,604
SHEET GLASS FORMING MACHINE
Filed July 17, 1937  18 Sheets-Sheet 13

Inventors
JOHN L. DRAKE.
GEORGE R. ROESCH.
By Frank Fraser
Attorney

Dec. 23, 1941.    J. L. DRAKE ET AL    2,267,604
SHEET GLASS FORMING MACHINE
Filed July 17, 1937    18 Sheets-Sheet 14
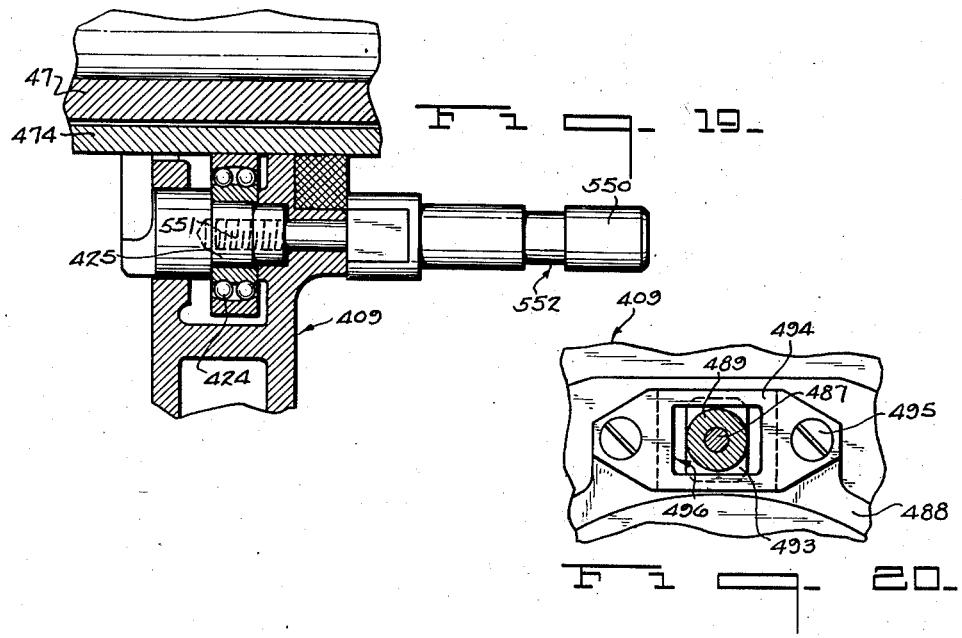
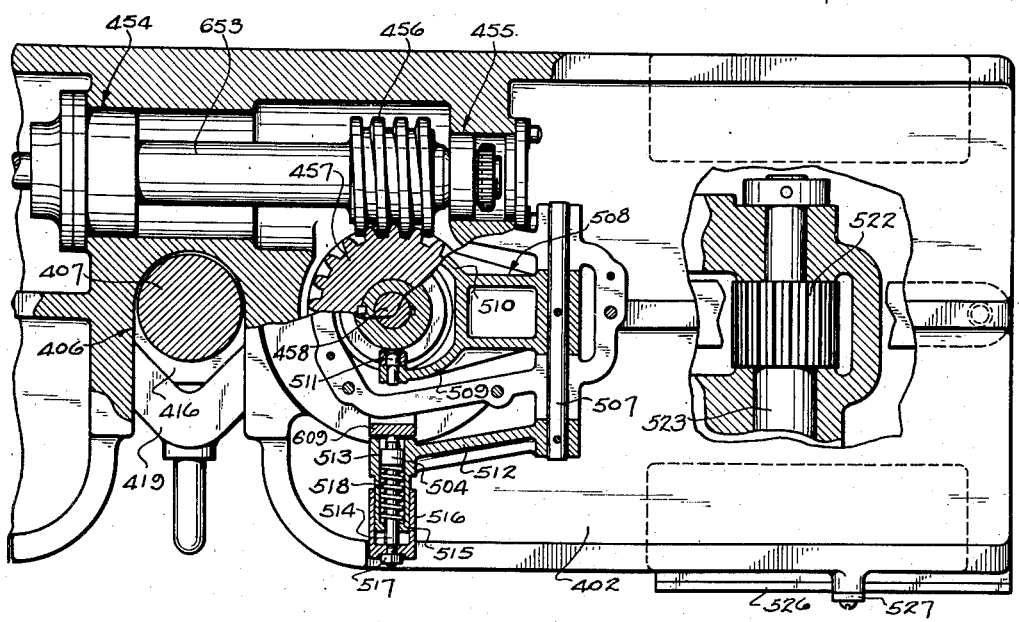
Inventors
JOHN L. DRAKE.
GEORGE R. ROESCH.
By Frank Fraser
Attorney

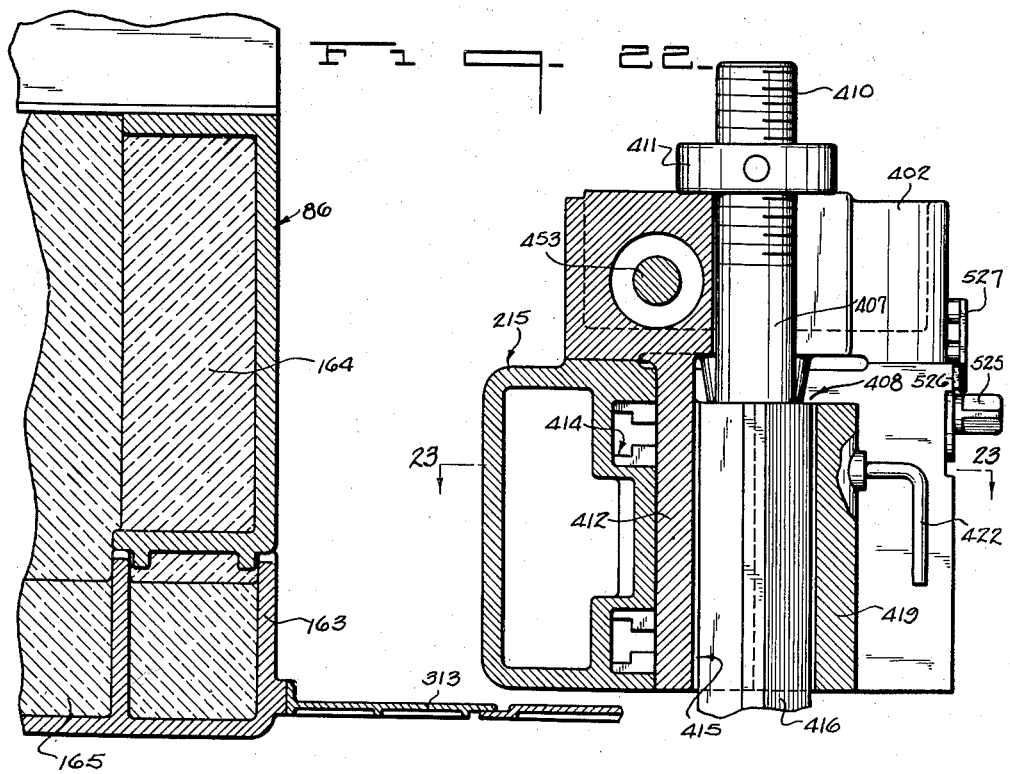
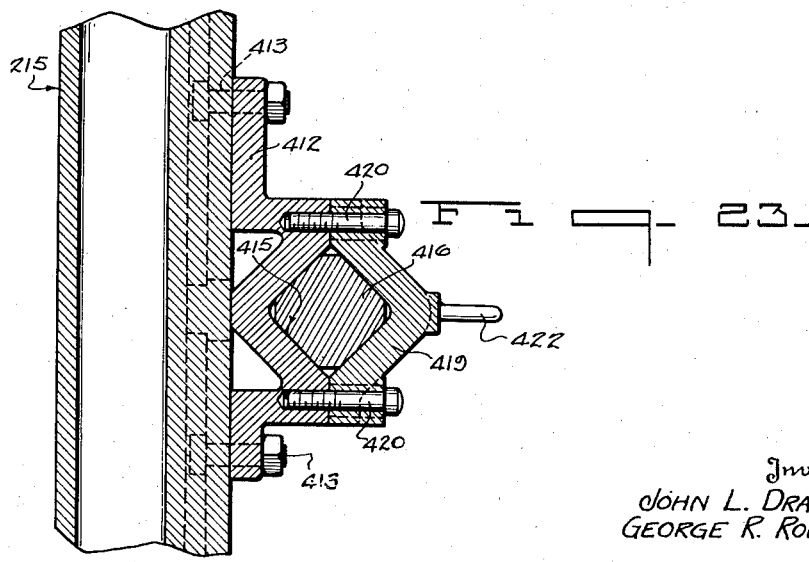

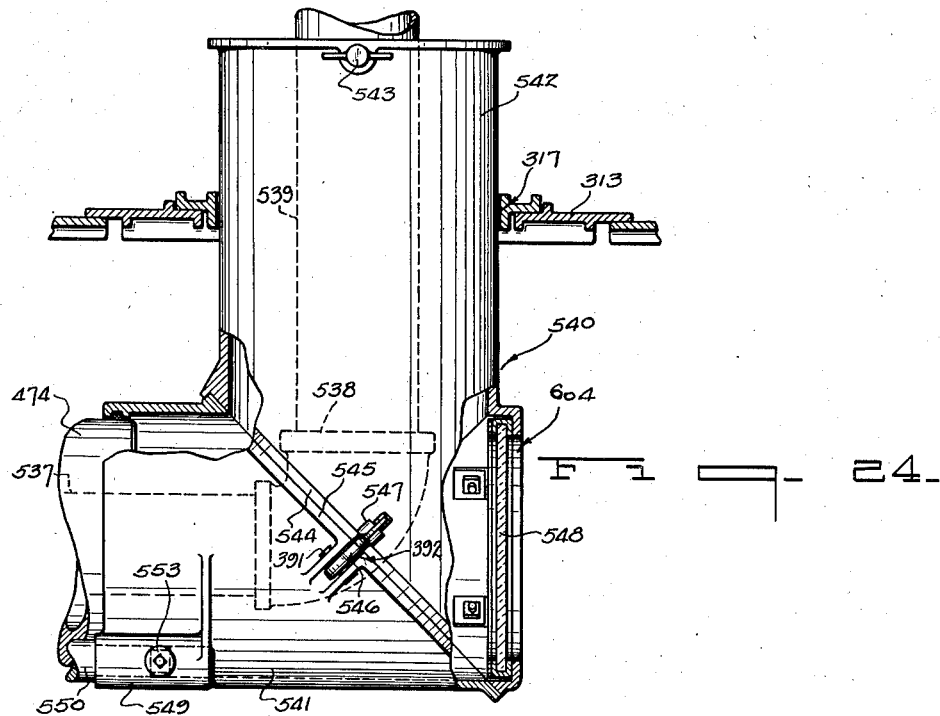
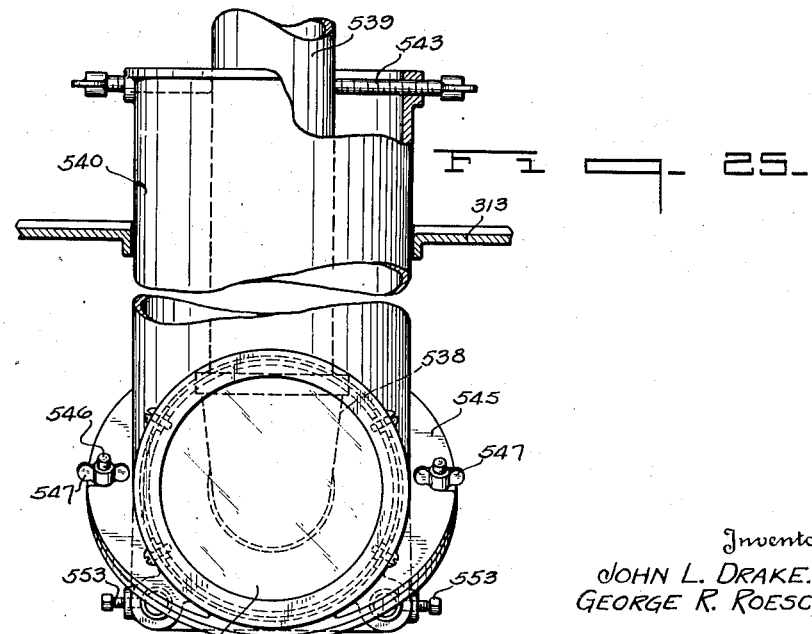
Inventors
JOHN L. DRAKE.
GEORGE R. ROESCH.

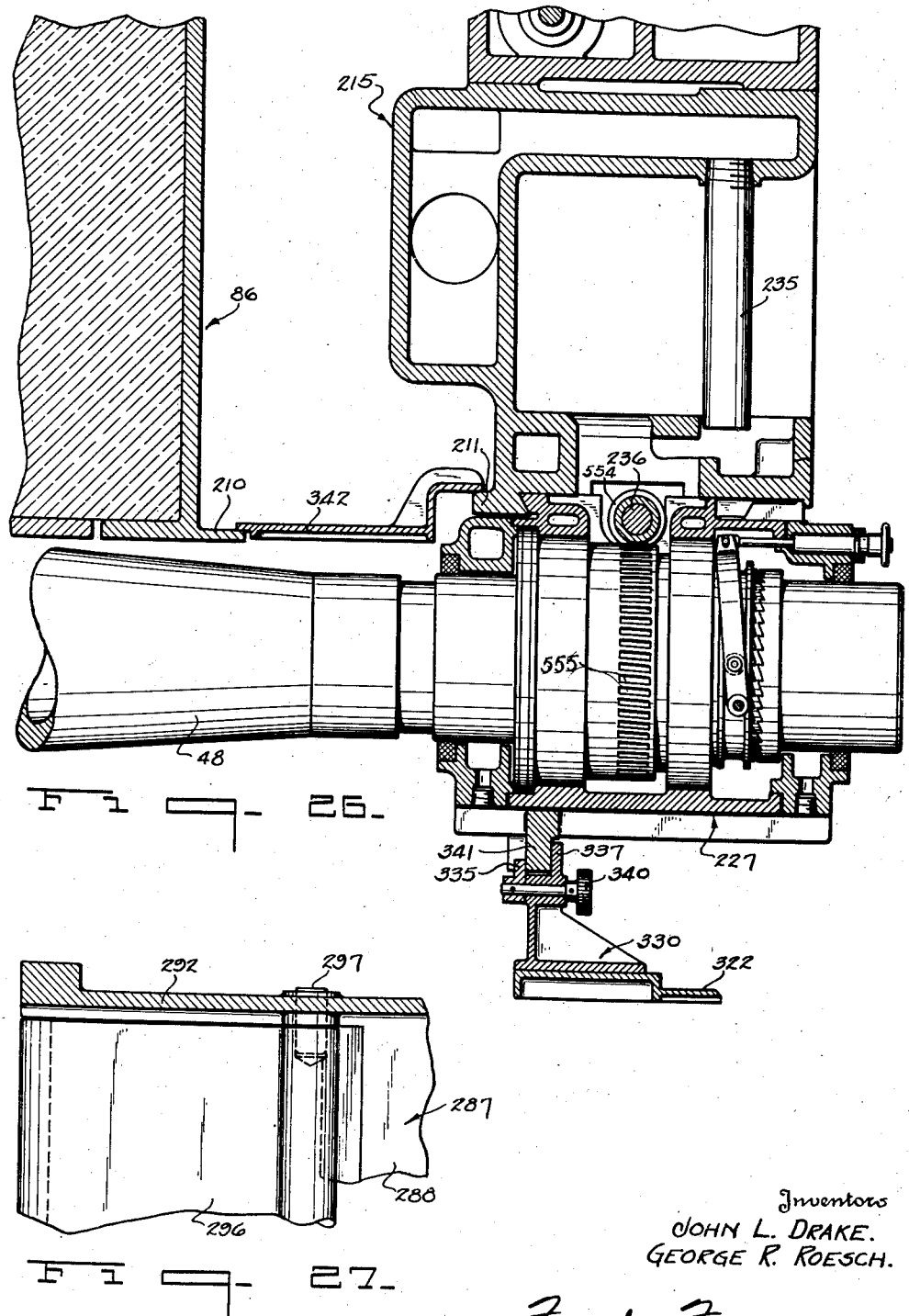

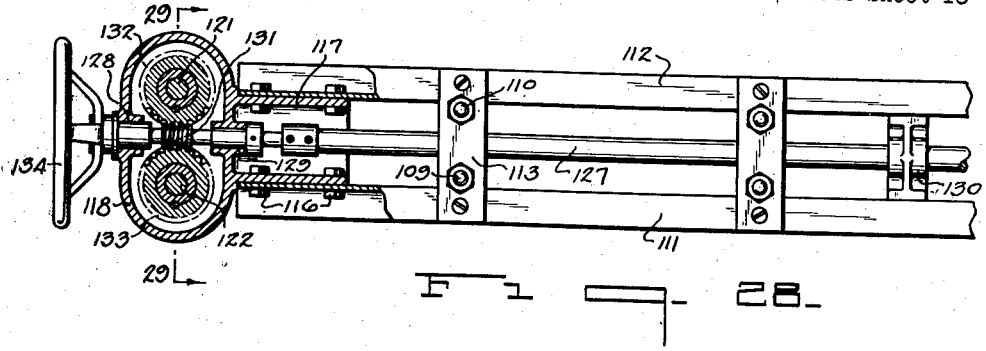
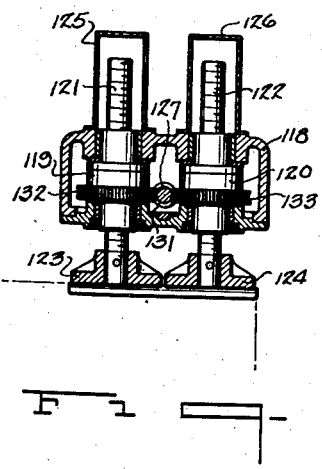
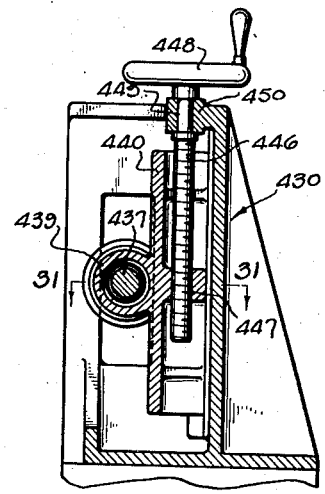
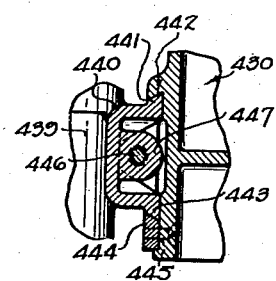

Patented Dec. 23, 1941

2,267,604

UNITED STATES PATENT OFFICE 2,267,604

SHEET GLASS FORMING MACHINE

John L. Drake and George R. Roesch, Toledo, Ohio, assignors to Libbey-Owens-Ford Glass Company, Toledo, Ohio, a corporation of Ohio Application July 17, 1937, Serial No. 154,166

10 Claims. (Cl. 49—17)

The present invention relates to the art of producing sheet glass and more particularly to a machine for drawing glass in continuous flat sheet form.

It is the aim of the invention to provide an improved machine for drawing sheet glass in accordance with the well known Colburn process, as exemplified on Patent #1,248,809, issued December 4, 1917, wherein a continuous sheet or ribbon of glass is drawn upwardly from the surface of a bath of molten glass contained in a relatively shallow working receptacle or drawpot and, while still in a semi-plastic condition, although substantially set in its final sheet form, is deflected over a bending roll into the horizontal plane and carried horizontally into and through an annealing leer.

An important object of the invention is the provision of a machine of the above character of such novel construction and arrangement as to render it more easily and accurately controllable as regards temperature and operation, thereby permitting the formation of a sheet of more uniform thickness and flatness and substantially free from waves and other surface defects.

Another important object of the invention is the provision of such a machine so constructed that the sheet being drawn is effectively protected from dirt, drafts, and other disturbing atmospheric conditions during its formative period and the interior of the machine maintained at a more constant uniform temperature, thereby greatly facilitating the formation of a sheet of exceptionally high quality.

Another object of the invention is the provision of such a machine embodying novel closure means for the opposite sides thereof which, while serving to effectively protect the sheet from dirt, drafts and other disturbing atmospheric conditions, permits easy and convenient access to the various parts of the machine which may be in need of repair or replacement.

A further object of the invention is the provision of such a machine embodying improved means for mounting and driving the bending roll in a manner that the said roll can be accurately adjusted both vertically and horizontally with respect to the working receptacle and also rotated at a relatively higher speed than that at which it is normally positively driven in order to effect the cleaning of the said roll without interrupting the operation of the machine.

A further object of the invention is the provision of such a machine embodying novel means for mounting the coolers and lip-tiles which are arranged at opposite sides of the sheet, being drawn in such a manner that desired adjustments thereof may be effected from outside the machine enclosure means to the end that the said coolers and lip-tiles may be adjusted without exposing the interior of the machine to dirt, drafts and other disturbing atmospheric conditions.

A still further object of the invention is the provision of such a machine including various other novel features of construction, arrangement, and design which combine and cooperate to produce a machine of great practicability and efficiency and one which has proven of outstanding commercial success.

Other objects and advantages of the invention will become more apparent during the course of the following description, when taken in connection with accompanying drawings.

In the drawings, wherein like numerals are employed to designate like parts throughout the same, Fig. 1 is a side elevation of a machine constructed in accordance with the present invention;

Fig. 2 is a vertical longitudinal sectional view therethrough;

Fig. 3 is a vertical sectional view through the enclosure means at one side of the machine, taken substantially on line 3—3 of Fig. 1;

Fig. 4 is a vertical sectional view through the enclosure means, taken substantially on line 4—4 of Fig. 1;

Fig. 5 is a vertical sectional view taken substantially on line 5—5 of Fig. 3 showing the supporting means for the sheet coolers;

Fig. 6 is a vertical sectional view taken substantially on line 6—6 of Fig. 1 showing the means for supporting one of the lip tiles;

Fig. 7 is a horizontal sectional view taken substantially on line 7—7 of Fig. 5;

Fig. 8 is an end elevation of Fig. 6, partially in section;

Fig. 9 is a vertical sectional view through the machine taken substantially on line 9—9 of Fig. 1;

Fig. 10 is a detail vertical sectional view taken substantially on line 10—10 of Fig. 2;

Fig. 14 is a vertical sectional view through the bending roll and supporting and drive means therefor, taken substantially on line 14—14 of Fig. 1;

Fig. 15 is a horizontal sectional view taken substantially on line 15—15 of Fig. 14;

Figure 17:
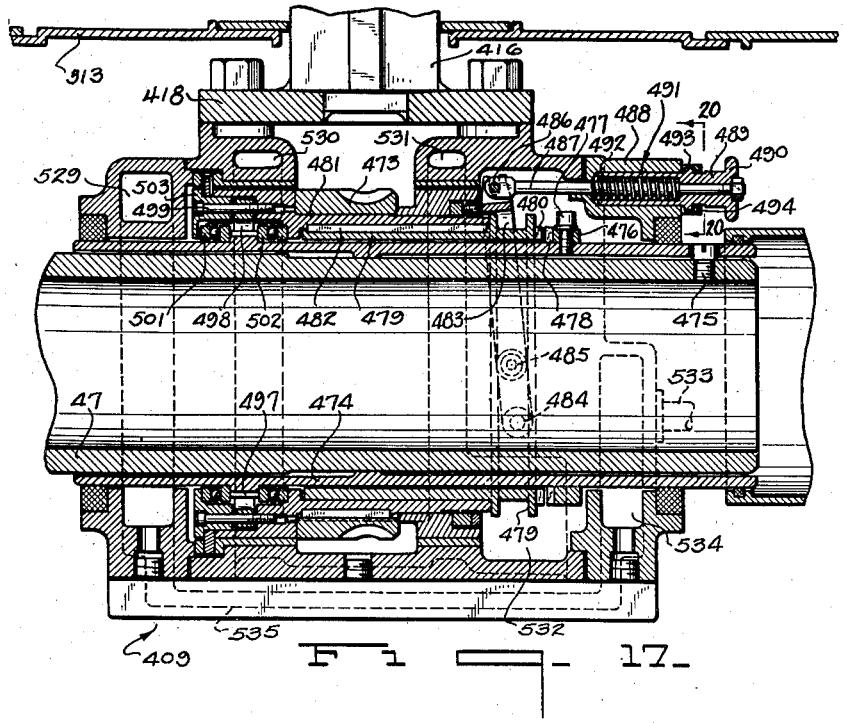
Figure 18:
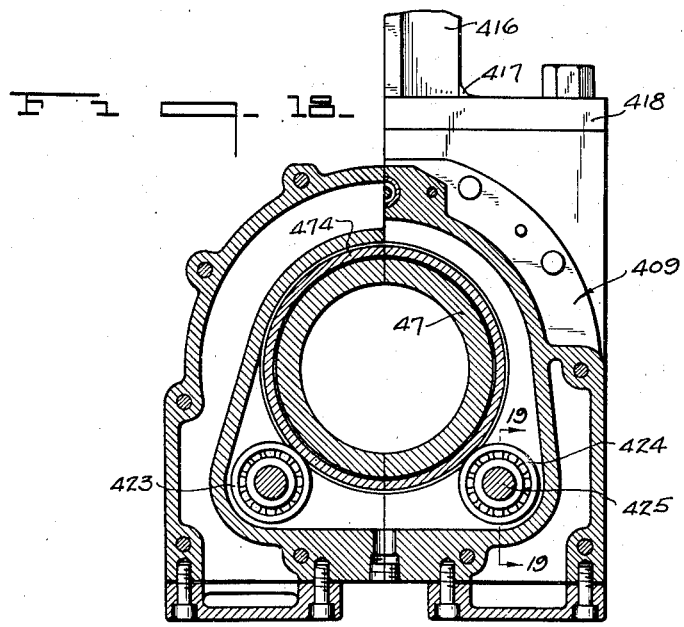

Figs. 16, 17 and 18 are detail sectional views of the bending roll supporting and drive means, taken respectively on lines 16—16, 17—17, and 18—18 of Fig. 15;

Fig. 19 is a detail sectional view taken substantially on line 19—19 of Fig. 18;

Fig. 20 is a detail sectional view taken substantially on line 20—20 of Fig. 17;

Fig. 21 is a horizontal sectional view through the bending roll adjusting and drive means taken substantially on line 21—21 of Fig. 14;

Fig. 22 is a detail vertical sectional view of the bending roll supporting means taken substantially on line 22—22 of Fig. 1;

Fig. 23 is a horizontal detail sectional view taken substantially on line 23—23 of Fig. 22;

Fig. 24 is a side elevation, partially in section, of the enclosure for the bending roll cooling means;

Fig. 25 is a view taken at right angles to Fig. 24;

Fig. 26 is a vertical sectional view of the idler roll and its supporting and drive means, taken substantially on line 26—26 of Fig. 1;

Fig. 27 is a detail horizontal sectional view taken substantially on line 27—27 of Fig. 3;

Fig. 28 is a horizontal sectional view of the supporting and adjusting means for the curtain tile, taken substantially on line 28—28 of Fig. 1;

Fig. 29 is a detail sectional view taken substantially on line 29—29 of Fig. 28;

Fig. 30 is a vertical sectional view of a part of the bending roll drive means, taken substantially on line 30—30 of Fig. 1;

Fig. 31 is a detail horizontal sectional view taken substantially on line 31—31 of Fig. 30.

Fig. 32 is a detail vertical sectional view of one of the roll supporting beams taken substantially on line 32—32 of Fig. 1; and Fig. 33 is a vertical sectional view of a portion of the enclosure means taken substantially on line 33—33 of Fig. 3.

GENERAL CONSTRUCTION AND OPERATION OF MACHINE

With reference now to the drawings and particularly to Fig. 2, the numeral 40 designates the outlet end of a continuous tank furnace of any conventional or preferred construction and in which a mass of molten glass 41 is adapted to be produced, refined, and cooled to the proper working temperature. The molten glass 41 flows from the furnace into a relatively shallow working receptacle or draw-pot 42 to form a relatively shallow bath of glass 43, said draw-pot being supported upon stools 44 within a heating chamber 45 which surrounds the said draw-pot and is heated in any desired manner.

A sheet of glass 46 is continuously drawn upwardly from the surface of the molten bath 43 and while still in a semi-plastic condition, although substantially set in its final sheet form, is deflected into the horizontal plane about a bending roll 47 and then passed over a so-called idler or intermediate roll 48 and through a drawing and flattening chamber 49 wherein the said sheet is supported and carried forwardly upon a series of horizontally aligned machine rolls 50. The sheet 46 passes from the drawing and flattening chamber 49, into an annealing leer 51 wherein it is supported and carried along upon a series of horizontally aligned rolls, one of which is shown at 52. As the sheet travels through the leer it is adapted to be suitably annealed and cooled as is well known in the art.

In order to maintain the glass sheet 46 being drawn to width, it is preferred to use knurled rollers 53 positioned to engage opposite sides of the sheet at each edge thereof, said rollers being arranged to grip the said sheet closely adjacent the base or meniscus 54 thereof. Arranged above the draw-pot 42 at opposite sides of the sheet are back and front lip tiles 55 and 56 respectively which serve not only to protect the sheet during its formative period from heat, gases, etc., issuing from the furnace 40 beneath the jack arch 57 and from the pot chamber 45, but also to direct such heat downwardly upon the surface of the bath of molten glass 43 to assist in properly conditioning the same. Disposed inwardly of the lip tiles 55 and 56 are the sheet coolers 58 and 59 respectively, each of said coolers consisting preferably of a hollow metallic casing, substantially rectangular in cross section, and through which a suitable cooling medium such as water or air is caused to be continuously circulated.

The side portions of the heating chamber 45, surrounding draw-pot 42, are closed at their upper ends by cover plates 60 (Figs. 4 and 6) which join the side walls 61 of said chamber and the side walls 62 of said draw-pot, while the openings at the opposite ends of the lip tiles 55 and 56 are closed by burner blocks 63 supported upon the cover plates 60, said blocks 63 being termed "burner blocks," because gas burners may be projected therethrough to heat the space above the bath of molten glass 43 if desired.

The bottom of the drawing and flattening chamber 49 comprises a series of transverse refractory blocks 64, the adjacent side edges of which are provided with tongues 65 which overlap one another. The blocks 64 are laid upon a sub-floor 66 of suitable insulating material supported by the transverse mantles 67 and 68. The end of the sub-floor 66 adjacent the draw-pot 42 rests upon the top of the adjacent end wall 69 of pot chamber 45, while the rear end of the lip tile 56 rests upon the sub-floor 66 to prevent heat and gases from passing from pot chamber into the drawing and flattening chamber 49. The top of the drawing and flattening chamber is formed of a series of refractory blocks 70 provided at their adjacent edges with overlapping tongues 71, said blocks being covered by suitable insulating material 72. The blocks 70 are hung from vertical rods 73 which pass upwardly through the insulating material 72 and are carried by horizontal supporting beams 74.

Positioned above the bending roll 47 is a refractory tile member 75 spaced from the first refractory block 70 to provide therebetween an opening 76 extending transversely of the machine and normally closed by a plurality of closure blocks 77 disposed in end to end relation as shown in Fig. 10. Mounted above the opening 76, in surrounding relation thereto, is a vertical flue or stack 78 and supported upon the upper end thereof is a plurality of upwardly tapering chimneys 79 arranged side by side transversely of the machine. Extending longitudinally of the stack 78, adjacent its upper end, is a horizontal shaft 80 having keyed thereto a plurality of pulleys 81, one being provided for each closure block 77. Fastened to each of the pulleys 81, as at 81', is one end of a chain 82, the opposite end being attached to the respective closure block 77 as at 83.

The shaft 80 projects at its opposite ends beyond the stack 78 and is rotatably supported at each end in a bearing 84 carried upon an I-beam 85 which is supported by the respective side frame 86 of the machine which will be more fully hereinafter described. One or both ends of the shaft 80 may be provided, outwardly of bearing 84, with an angular portion 87 which may be engaged by a wrench or other tool to effect the turning of said shaft. Upon rotation of the shaft 80 and pulleys 81 carried thereby, the chains 82 will be wound upon said pulleys to effect the raising of the closure blocks 77 to provide communication between the stack 78 and the interior of the machine, the purpose of the stack being to carry away excessive heat from within the drawing and flattening chamber 49 and around the bending roll should the temperature therein become too great. Upon raising of the closure blocks 77, the desired amount of heat will be permitted to escape through the opening 76 to the stack.

In order to maintain the closure blocks 77 in raised position, the shaft 80 may be provided at one or both ends with a ratchet wheel 88 and cooperating therewith is a dog 89 pivoted as at 90 (Fig. 1) to a bracket 91 carried by the I-beam 85. The pivoted dog 89 engaging ratchet wheel 88 will prevent accidental turning of the shaft to maintain the closure blocks in raised position, while in order to lower the closure blocks, it is simply necessary to release the dog from engagement with the said ratchet wheel. The shaft 80 can also be supported intermediate its ends by a plurality of bearing brackets 84' carried within the stack 78. It will also be appreciated that a single closure block 77 instead of a plurality of smaller blocks arranged end to end may be utilized if preferred.

Arranged forwardly of the tile member 75 and cooperating therewith and also with the back lip tile 55 to form the front end wall of the drawing and flattening chamber 49 is a vertical curtain tile 92 provided adjacent its upper end with a beveled surface 93 adapted to engage a correspondingly beveled surface 94 on the tile member 75, the lower end of the curtain tile overlapping the upper end of the lip-tile 55 which is cut back or notched as at 95.

The front lip tile 55 is mounted for vertical adjustment and to this end is provided with a transversely disposed opening 96 through which extends a rod 97. The lip tile may be cut out at spaced intervals to permit the hanging of link members 98 upon the rod 97, said link members in turn surrounding a second transverse rod 99. Encircling the rod 99 are a plurality of strap members 100 which are carried by the lower hooked ends of vertical rods 101 extending upwardly through a plate 102 carried by an I-beam 103 and having nuts 104 threaded upon the upper ends thereof. With this construction, the forward end of the lip tile can be raised or lowered as desired upon proper adjustment of the nuts 104, with the rear end of said tile pivoting on the ledge 105 of the jack arch 57 during adjustment thereof.

The curtain tile 92 is also adjustably mounted so that it can be moved vertically to correspond to any adjustment of the lip tile 55. Thus, the curtain tile is provided adjacent each end and intermediate the top and bottom thereof, with an outwardly projecting ear 106 and passing transversely through these ears is a horizontal rod 107 while a rod 108 passes horizontally through the curtain tile adjacent the upper end thereof. Secured to the transverse rods 107 and 108 at spaced points throughout the length thereof are vertical rods 109 and 110 respectively which pass upwardly between spaced horizontal channel beams 111 and 112 and through plate 113 supported upon said channel beams, said rods 109 and 110 having nuts 114 and 115 respectively threaded upon the upper ends thereof.

As best shown in Figs. 28 and 29, the channel beams 111 and 112 are secured at each end by bolts or the like 116 to the extension 117 of a housing 118 within which are rotatably mounted vertical bearings 119 and 120 through which are threaded screws 121 and 122 carrying at their lower ends base plates 123 and 124 respectively which are supported upon the respective side frame 86 of the machine as illustrated in Fig. 1. The upper ends of the screws 121 and 122 are preferably enclosed by cap members 125 and 126 carried by housing 118. Extending longitudinally between the channel beams 111 and 112 is a shaft 127 rotatably supported in each housing 118 by spaced bearings 128 and 129 and also in bearings 130 carried at spaced intervals by the channel beams 111 and 112. Keyed to the shaft 127 within each housing 118 is a worm 131 which meshes with worm gears 132 and 133 keyed to the rotatable bearings 119 and 120 respectively. Carried at each end of the shaft 127 outwardly of the respective housing 118 is a hand wheel 134. With this construction, it will be seen that upon turning of the hand wheels 134 to rotate the shaft 127 and worm gears 132 and 133, the bearings 119 and 120 will be threaded either upwardly or downwardly upon the screws 121 and 122 to effect the raising or lowering of the housings 118, channel beams 111 and 112 and curtain tile 92.

The tile member 75 is also adjustably mounted so that it can be moved vertically to correspond to the adjustment of the curtain tile 92 whereby to maintain the beveled surfaces 93 and 94 thereof in proper engagement. For this purpose, the tile member 75 is suspended at each end from vertical rods 135 and 136 passing upwardly through a plate 137 supported upon channel beams 138 and having nuts 139 and 140 threaded upon their upper ends. Upon proper adjustment of the nuts 139 and 140, the tile member 75 can be either raised or lowered.

In order to hold the draw-pot 42 tightly against the bottom 141 of the furnace whereby to prevent molten glass from seeping through the joint 142 between the said furnace and draw-pot, there may be provided one or more pusher blocks 143 (Fig. 2) which extend through the end wall 69 of pot chamber 45 and engage the front end of the draw-pot to hold the said draw-pot tightly against the furnace. Each of the blocks 143 is carried in a metal frame or holder 144 secured to the forward end of a tubular member 145 which is carried by brackets 146 and 147 secured to the mantles 67 and 68 respectively. Loosely received in the outer end of the tubular member 145 is one end of a rod 148 bearing at its opposite end against a plate 149 secured to a fixed bracket or the like 150. The rod 148 is threaded intermediate its ends as at 151 and threaded thereon is a nut 152. Encircling the tubular member 145 is a compression spring 153 bearing at one end against a collar 154 carried by tubular member and at its opposite end against the nut 152 on rod 148. The action of the spring 153 bearing against collar 154 will force the tubular member 145 forwardly to maintain the block 143 in firm engagement with the front end of the draw-pot and the rear end of said draw-pot tightly against the furnace.

Machine side frames

One of the machine side frames 86 referred to above is arranged at each side of the machine and these frames constitute, in effect, the side walls of the drawing and flattening chamber 49. A side elevation of a portion of one of the frames 86 is illustrated in Fig. 12, said frame being supported at one end upon a transverse water cooled mantle 156 (Fig. 1), mounted at each end upon a column 157, and at its opposite end upon a transverse mantle 158 carried by columns 159 and intermediate its ends upon one or more mantles 160 carried by columns 161, it being understood that the mantles 156, 158 and 160 extend the entire width of the machine.

Figure 12:
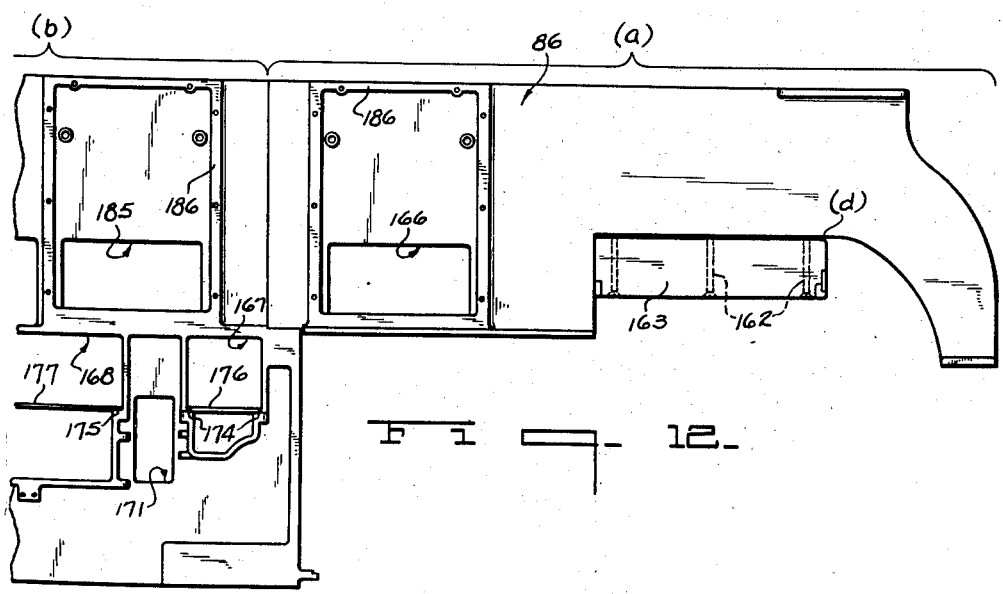
Fig. 12 is a side elevation of one of the machine side frames.

As best seen by comparison of Figs. 2 and 12, the portion a of the side frame 86 is arranged opposite the bending roll 47, idler roll 48, and first two machine rolls 50', while the portion b of said frame is arranged opposite the remainder of the machine rolls 50, terminating at the entrance of the leer 51 as indicated at c. Further, that the portion a of the side frame is only disposed above the said bending roll, idler roll, and first two machine rolls while the portion b extends both above and beneath the remainder of the said machine rolls. In other words, the bending roll, idler roll and first two machine rolls extend beneath the portion a of the side frame while the remainder of the machine rolls extend through openings in the portion b of said frame as will be later explained. The portion a of the side frame is also cut away as at d, and secured to the underside thereof by screws or the like 162 is an auxiliary frame member 163.

Each side frame 86 is backed up throughout with insulating material except where it is provided with openings for the machine rolls 50 and for doors and peep holes. For instance, the cross sectional form of the portion a of the frame, opposite the bending roll 47, is illustrated in Figs. 10 and 22, and it will be seen that the said frame is substantially channel shaped and backed by insulation 164 while the auxiliary frame member 163 is also filled with insulating material 165. The cross sectional form of the machine frame opposite the idler roll 48 and first two machine rolls 50' is substantially the same except that part of the frame above the first two machine rolls 50' is provided with an opening 166 (Fig. 12) through which the sheet may be inspected by the operator as it passes over the rolls, said opening 166 being closed by a vertically adjustable shutter as will be hereinafter described.

The remainder of the machine rolls 50 extend through a series of openings 167 and 168 in the lower part of the portion b of the side frame, the openings 167 being each provided for the reception of a single roll and the openings 168 for two rolls. The lower portion of each of the openings 167 is closed by a door 169 (Fig. 1) hinged to the side frame at 169' while the lower portion of each of the openings 168 is closed by the double doors 170 also hinged to the side frame at 170'. Formed between the openings 167 and 168 in the side frame are burner openings 171 through which gas burners may be projected, said openings being closed by a cover 172 having a peep hole therein normally closed by a plate 173. As seen in Fig. 12, the side walls of the openings 167 and 168, above the doors 169 and 170, are formed with horizontal ledges 174 and 175 and supported upon these ledges are horizontal shelves 176 and 177 respectively, which separate the openings 167 and 168 into upper and lower portions, with the lower portions being closed by the said doors 169 and 170.

Figure 13:
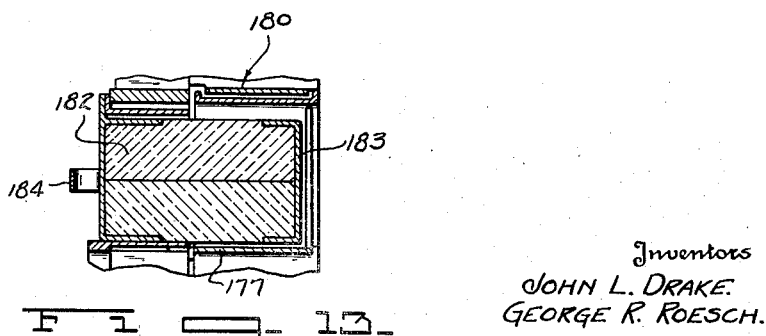
Fig. 13 is a detail sectional view taken substantially on line 13—13 of Fig. 1.

The cross sectional form of the portion b of the machine side frame 86 is shown in Fig. 9 wherein the shaft 178 of one of the machine rolls 50 passes through one of the openings 168. Carried upon the shelves 176 and 177 are insulating units 179 (Fig. 9) surrounding the machine roll shafts and closing the upper portions of the openings 167 and 168. Arranged between adjacent machine rolls and especially above the double doors 170 is an insulating unit 180 (Fig. 13) comprising insulating material 182 mounted in a metal casing 183 provided with a handle 184 to facilitate the removal and insertion of said unit.

The upper part of the portion b of the side frame 86 may be provided with one or more openings 185 similar to opening 166 and the said frame is formed with a forwardly directed continuous flange 186 surrounding each opening and to which is secured a cover 187 (Fig 9) by bolts or the like 190, said cover having an opening 191 therein closed by a transparent glass window 192 hinged at 193. The cover 187 cooperates with the frame 186 to form a closed compartment 194 and mounted therein is a shutter 195 closing the opening 185, said shutter including two plates of refractory material 196 and 197 secured together in a metal frame 198, said frame being provided with a flange 199 received between the said plates 196 and 197 for spacing the same. The frame 198 is pivotally mounted by means of a transverse pin 200 to the lower end of a link 201 pivoted at its upper end as at 202 to an arm 203 fixed to a transverse shaft 204 journaled in the side frame. Also keyed to the shaft 204 outwardly of the cover 187 is a substantially L-shaped bracket 205 to the vertical portion of which is secured a substantially vertical lever arm 206 having a counter-weight 207 at its upper end. The lever arm 206 is secured to the bracket 205 by a bolt 208 passing through a slot 209 therein so that the said weight can be moved upwardly or downwardly as desired. When the operator wishes to inspect the glass sheet, it is simply necessary for him to raise the shutter 195 by swinging the lever arm 206 to rotate shaft 204 whereupon the said sheet can be viewed through the glass window 192.

Mounting and drive for machine rolls

Figure 11:
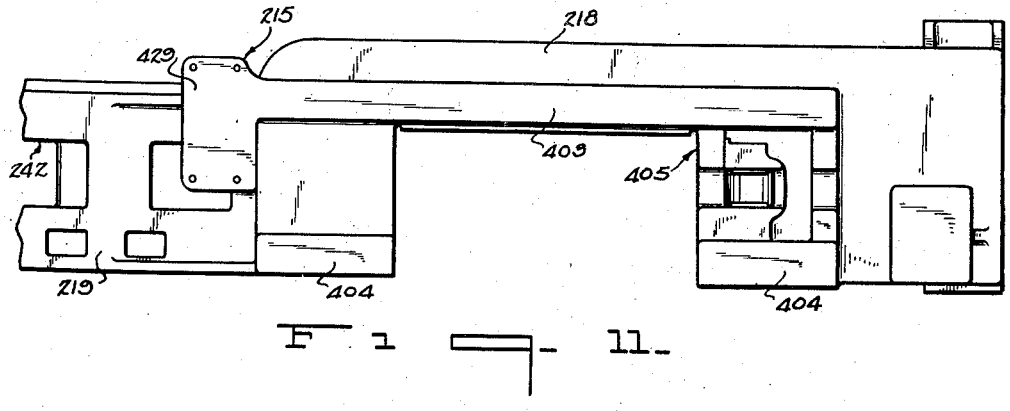
Fig. 11 is a plan view of one of the roll supporting beams.

The means for supporting the bending roll 47, idler roll 48 and machine rolls 50 and for holding these rolls in accurate alignment are entirely independent of the side frames 86. For this purpose there is arranged at each side of the machine, outwardly of the side frame 86, a longitudinally extending beam 215, a plan view of which is illustrated in Fig. 11. Each beam is supported at one end upon the mantle 156 (Fig. 1), which also supports the side frame 86, and at its opposite end upon a pedestal 216 carried by the mantle 158 and intermediate its ends by the pedestal 217 carried upon mantle 160. The portion 218 of the beam is of substantially inverted U-shape in side elevation and extends up over the bending roll while the portion 219, which is supported upon the pedestals 216 and 217 is in the form of a straight hollow beam of the cross section shown in Fig. 4 and secured to the top of the pedestals 216 and 217 by screws 220 (Fig. 6).

The shaft 178 of each of the machine rolls 50 is rotatably supported at each end in a bearing housing 221 suspended from the respective supporting beam 215, as best shown in Fig. 4, each of the bearing housings 221 is detachably associated with its respective supporting beam so that it may be easily and conveniently removed whenever desired to the end that the mounting of each of the rolls 50 is entirely independent of the mounting for the other rolls so that any one roll may be removed from the machine without disturbing the remaining rolls. Thus, the bearing housing is provided at its upper inner end with an enlarged beveled portion 222 adapted to fit within the chamfered or undercut groove 223 in the beam. The bearing housing is also provided at its upper outer end with a similarly enlarged beveled portion 224 which is adapted to fit a removable block 225 carried by the beam and removably secured thereto by bolts 226 (Fig. 1). The inner edges of the blocks 225 are beveled to correspond to the beveled portions 224 on the bearing housing. From the above, it will be readily apparent that when it is desired to remove anyone of the rolls 50, it is simply necessary to first remove the blocks 225 whereupon the bearing housings can be detached from the supporting beam by sliding them forwardly. The rolls can then be removed from the machine through the openings 167 and 168 in the side frame 86. The idler roll 48 is carried at each end in a bearing housing 227 (Fig. 26) also suspended from the supporting beams 215 in the same manner as the machine rolls.

The beams 215 are preferably made hollow so that a suitable cooling medium such as water can be circulated therethrough and likewise the bearing housings 221 are also adapted to be internally cooled. In order to provide for the cooling of the said beams and bearing housings, there is arranged along side of each beam a supply pipe 228 (Fig. 1) from which lead the branch pipes 229, one of which discharges into each bearing housing, with the supply being controlled by a valve 230. The water, after circulating through the bearing housing passes out through a pipe 231 and discharges into the beam through an opening 232 (Fig. 4) and, after circulating through the portion 219 of said beam passes out through an opening 233 (Fig. 32) into one or both pedestals 216 and 217. The portion 218 of the supporting beam above the bending and idler rolls is cooled by water introduced therein through an opening 234 (Fig. 1) said water circulating through this portion of the beam and being discharged therefrom into the portion 219 of the beam through an overflow pipe 235 shown in Fig. 26.

All of the machine rolls 50 are adapted to be driven from a common line shaft 236 (Fig. 1) extending beneath one of the beams 215 and supported on bearings 237 carried by said beam. The shaft 236 is arranged beneath beam 215 as shown in Fig. 6 and is held in place by guide blocks 238 secured to the beam by screws 239 (Fig. 1). The shaft 236 has keyed thereto a plurality of worms 240, one for each roll 50 and adapted to mesh with a worm gear 241 fixed to the shaft 178 thereof. The beam 215 may be provided above each worm 240 with an opening 242 (Fig. 4) closed by a removable plate 243, the purpose of these openings being to permit the operator to inspect and oil the worm drive for the rolls. The line shaft 236 is driven from a vertical shaft 244 driving through a flexible coupling 245 and shaft 246 the intermeshing gears 247 and 248, said shaft 246 being mounted in a bearing 249 carried by the beam 215 and in turn driven from the main drive shaft 250 through a universal coupling 251 and suitable reduction gearing contained in the gear case 252.

As will be seen from the above, the machine side frames 86 constitute the side walls of the drawing and flattening chamber 49 and serve to enclose the opposite sides of the machine with the exception of those portions beneath the portions a of said frames. In order to completely enclose the opposite sides of the machine, there are provided, outwardly of and beneath the portion a of each side frame 86, two metal enclosures designated in their entirety at 253 and 254 (Fig. 1), said enclosure 253 being disposed opposite the bending roll 47 while the enclosure 254 is disposed opposite the idler roll 48 and first two machine rolls 50'. The two enclosures 253 and 254 comprise sectional metal housings provided with a common bottom member 255, consisting of a casting secured at one end to a bracket 256 (Fig. 1), carried by the column 157 and at its opposite end to the pedestal 217 by bolts or the like 257 (Fig. 6) passing through horizontal slots 258. As shown in Figs. 3 and 4 the bottom casting 255 is provided with longitudinally extending chambers 259, 260 and 261 for gas, air, and water respectively. These chambers are adapted to be tapped to obtain the necessary gas, air, and water for the different parts of the machine such as the width maintaining rollers 53, sheet coolers 58 and 59, as well as other coolers or burners which may be used. The water may be supplied to the water chamber 261 through a supply pipe 262 (Fig. 1) and taken therefrom through a series of outlet pipes 263, having branches 264 leading through the bottom into the enclosure 253 (Fig. 3) and a second series of pipes 265 having branches 266 projecting through the said bottom into the enclosure 254 (Fig. 4), the supply of water to branches 264 and 266 being controlled by valves 267 and 268 respectively. The bottom casting 255 is also provided with a catch basin 269 adapted to receive the discharge water and from which it passes to the sewer through an outlet pipe 270. The supply of gas and air is fed to the chambers 259 and 260 in any desired manner and the said chambers are tapped by the two series of pipes 271 and 272 respectively, having branches 273 and 274 which project into the enclosure through the bottom thereof and to which may be fastened the supply pipes for burners, air coolers, etc. The supply of gas and air is regulated by valves 275 and 276 operated by handle 278. From the above, it will be seen that the supply of water, gas and air to the coolers, burners, knurled rolls, etc., can be regulated by the operator from outside the enclosures 253 and 254.

With reference particularly to Figs. 1, 3, 4 and 5, the machine enclosure 253 also includes the spaced vertical lower side walls 279 and 280 which are provided at their upper ends with horizontal ledges 281 and 282 respectively upon which are supported the top plates 283. The front of the lower portion of the enclosure is closed by a door 284 hinged to side wall 280 at 285 and provided with a transparent glass plate 286. Arranged inwardly of the bottom casting 255 is a substantially U-shaped enclosure member 287 best shown in Figs. 3 and 33, and comprising a bottom 288 secured to the bottom casting by bolts or the like 290 and vertical side walls 291 and 292 in alignment with the side walls 279 and 280 respectively, and provided at their upper ends with horizontal ledges 293 and 294, also supporting cover plates 295 which are in horizontal alignment with cover plates 283. As shown in Figs. 3 and 27, the bottom 288 of the U-shaped enclosure 287 is provided with a hinged portion 296 pivoted upon pins 297 and downturned at its forward edge at 298 so that it will bite into the upper surface of the cover title 60 and prevent the entrance of drafts and dirt into the machine beneath the enclosure.

As illustrated in Figs. 5 and 33, the side walls 279 and 280 and also the side walls 291 and 292 of the enclosure 253 are provided in their upper edges with grooves or channels 299 and 300 respectively and slidably supported therein are the upper side walls 301 and 302 of the enclosure. The side wall 301 is preferably solid and of one piece and extends throughout the length of the lower side walls 279 and 291. The side wall 302, however, is preferably made of two sections 303 and 304 (Fig. 3), with the outer vertical edge of the section 303 having a channel portion 305 in which is received the rear end of the front plate 304, the said plates being secured together by bolts or the like 306, passing through also to 307. The sections 303 and 304 are preferably provided with windows 308 and 309. The upper portion of the enclosure is also provided with a door 310 hinged to side plate 304 as at 311 and having a glass window 312 therein. The top of the enclosure is formed of a plurality of metal plates 313 supported upon the upper ends of the side walls 301 and 302, said plates being provided at their opposite ends and upon their under surfaces with channels 314 and 315 which fit over the upper edges of the said side walls 301 and 302 respectively while formed in said top plates 313 are openings 316 and 317, the purpose of which will be more clearly hereinafter apparent. As shown in Fig. 3, the top wall 313 of the enclosure 253 cooperates with the frame 163 to seal the upper end of the enclosure and in order to obtain a more effective seal, the said frame member may be provided with slots 326 in which the upper portions of the side walls may fit. The side walls 292 and 302 also butt against a brick wall 318 (Fig. 1) opposite the curtain tile 92 to seal the end of the enclosure.

The lower side wall 279 of the enclosure 253 constitutes one side wall of the enclosure 254, while the opposite side wall of said enclosure is formed by the pedestal 217. The enclosure 254 is also provided with a door 319 hinged at 320 to the said side wall 279 and having a glass plate 321 therein. The enclosure 254 also comprises a horizontal top 322 and a bottom plate 323 (Fig. 4) supported at one end upon the upturned portion 324 of the bottom casting and pressing at its opposite end against the burner block 63. The door 319 of the enclosure 254 and likewise the doors 284 and 310 of the enclosure 253 are provided with catches 325 to maintain them closed and to also facilitate the opening and closing thereof.

In order to close the space between the top 322 of the enclosure 254 and the bearing housings 221 suspended from the supporting beam 215, are the bracket plates 328, 329 and 330 (Fig. 1). As shown particularly in Fig. 4, each of the bracket plates 328 and 329 is provided with a base 331 supported upon the top of the enclosure and having formed integral therewith a vertical plate 332 provided at its upper end with a bearing 333 through which is inserted a horizontal pin 334; said pin being provided, carrying at its inner end a catch 335 and at its outer end a handle 336. Formed integral with the bearing 333 is an upstanding flange 337; while carried by the bearing housing 221 is a depending flange 338 secured thereto by screws 339. As shown in Fig. 4 the flange 338 is arranged inwardly of and overlaps the flange 337, so that when it is desired to secure the bracket plate 328 in position, the handle 336 is turned so that the catch 335 will engage the rear surface of the depending flange 338. The bracket plate 330 is of substantially the same construction as shown in Fig. 26, with the exception that a thumb nut 340 is substituted for the handle 336. The flange 337 and catch 335, however, cooperate with the depending flange 341 carried by bearing housing 227 to secure the bracket plate 330 in position. The enclosure 254 is completed by the horizontal plates 342 arranged above the idler roll 48 and first two machine rolls 50' and supported by a flange 210 on the machine side frames 86 and a flange 211 formed on the supporting beams 215, as shown in Figures 4 and 26.

*Sheet cooler supporting and adjusting means*

The means provided for supporting and adjusting the sheet coolers 58 and 59 is illustrated in Figs. 5 and 7 and as shown therein the lower side walls 279 and 280 of the enclosure 253 at each side of the machine are provided with bays 343 and 344 respectively. Each of these bays is provided with upper and lower aligned bearings 345 and 346 in which is mounted a vertical post 347 adapted for vertical sliding but non-rotatable movement, said post being carried at its upper end by a screw 348 passing loosely through a plate 349 and having threaded engagement with said post. The plate 349 is carried upon the upper end of a bushing 350 mounted in the bearing 345 and supported upon the upper end thereof by a shoulder 351. The upper portion of the post 347 is reduced in diameter as at 352 to form a resultant shoulder 353 and loosely mounted upon the reduced portion 352 of said post and supported upon said shoulder is a sleeve 354, said sleeve carrying or having formed integral therewith a horizontal bracket arm 355 carrying at its outer end a substantially channel-shaped supporting block 356. Threaded upwardly through the bracket arm 355 at opposite sides of the supporting block 356 are screws 357 and 358.

As pointed out above, each cooler 58 and 59 comprises a hollow metal casing substantially rectangular in cross section and through which water or other suitable cooling medium is adapted to be circulated. Assuming that water is used, it can be introduced into each end of the casing through a pipe 359 and after circulating therethrough discharged from opposite ends thereof through pipes 360. The cooler is supported by the pipes 359 which rest upon the blocks 356 and in order to maintain the cooler in proper vertical position, a metal plate 361 is inserted between the two pipes 359 and 360 and is engaged by the screws 357 and 358.

When it is desired to adjust the coolers vertically, it is simply necessary to rotate the screws 348, whereupon the posts 347 may be raised or lowered to raise or lower the bracket arms 355 and as a consequence the coolers. With this construction, the coolers can also be adjusted bodily toward or away from the glass sheet by rotating the sleeves 354 to swing the bracket arms 355 horizontally through an arc, as indicated by the broken lines in Fig. 7. This is done by providing the upper end of each bushing 350 with a series of openings 362 in which a suitable tool may be inserted and upon turning of the said bushings, the sleeves 354 will be turned therewith. The bushings can be maintained in proper position by set screws 363. The bays 343 and 344 are adapted to receive the bracket arms 355 when the coolers are removed.

As shown in Fig. 3, the water for cooling each sheet cooler 58 and 59 may be supplied to the pipe 359 at each end of the respective cooler through a flexible conduit 364 attached to one of the branch pipes 264 while the water can be discharged from the pipe 360 through a flexible conduit 365 to the catch basin 269.

*Back lip-tile supporting means*

The means for supporting the back lip-tile 56 is best shown in Figs. 6 and 8, said lip-tile being provided with a transverse opening 367 through which extends a rod 368. The lip-tile is provided at the top thereof with a plurality of spaced recesses or notches 369 within which are inserted the lower ends of triangular shaped hanger plates 370 provided with openings through which the rod 368 extends. Arranged above the lip-tile and also extending longitudinally thereof are spaced horizontal supporting members 371 and 372 which also extend through the openings in the hanger plates 370 whereby the lip-tile is hung or suspended from said members.

Arranged at each end of the lip tile is a substantially horizontal arm 373 upon which is mounted a recessed plate 366 for supporting the corresponding ends of the members 371 and 372. Each arm 373 is carried adjacent its inner end by a cylindrical member 374 through which it passes and which fits within a recessed portion 375 in the pedestal 217 so as to provide, in effect, a ball and socket joint to permit vertical swinging of the arm 373 to raise and lower the forward end of the lip tile. Also carried by the pedestal 217 is a bracket 376 having a bearing portion 377 through which is threaded a vertical screw 378 formed at its upper end with a cradle 379 for supporting said arm 373, said cradle being secured in place by a nut 380. The adjustment of the lip-tile is desirable as the position thereof should be varied if necessary during the forming of the sheet to meet varying working and temperature conditions.

The arms 373 are ordinarily subjected to an intense heat and it is therefore desirable that means be provided for internally cooling the same. To this end, the said arms are hollow and arranged within each arm is a pipe 381 through which the cooling medium may be introduced, said cooling medium, after circulating through the arm, being permitted to escape therefrom through an outlet 382.

As shown in Fig. 8, each of the members 371 and 372 comprises an outer cylindrical shell 383 closed at each end by a cap 384 and having disposed therein a longitudinally extending cylindrical core 385. The core is somewhat shorter than the shell and spaced from each end thereof to provide a chamber 386. The core is also provided, preferably at equidistantly spaced points around the periphery thereof, with a plurality of longitudinally extending grooves or ducts 387 open at their opposite ends and communicating with the chambers 386. Associated with the cap 384 at one end of the shell is an inlet pipe 388 while associated with the chamber at the opposite end is a similar outlet pipe. The water or other cooling medium is therefore adapted to enter the chamber 386 at one end and flow through the longitudinally extending grooves or ducts 387 into the chambers at the opposite end, from which it is carried away through the outlet pipe. The inlet pipe 388 can be suitably connected to one of the water supply pipes 266 (Fig. 4) while the outlet pipe can discharge the water into the catch basin 269. The arms 373 may be firmly secured in adjusted position by relatively long set screws 389 which pass through the pedestal 217 and engage a flat surface 390 on the said arm 373.

*Knurled roller supporting means*

The means for supporting the knurled rollers 53 is arranged within the machine enclosures 253 at opposite sides of machine as shown in Fig. 3. Each knurled roller is carried at the forward end of a tubular member 393 journaled in a housing 394 carried by a bar plate 395, supported upon the bottom casting 255, the said base plate 395 being provided with depending lips 396 and 397 overlapping flanges 398 and 399 on said bottom casting to hold the housing 394 in place. The means for mounting and driving the knurled rollers is substantially the same as that disclosed in the above mentioned Colburn Patent 1,248,809, and therefore need not be described in detail herein. The knurled rollers are, of course, adapted to be internally cooled, as also disclosed in said patent, and the water used for this purpose may be discharged into each of the tubular members 393 by a flexible conduit 400 attached to one of the branch pipes 264, while the water can be passed from the tubular member 393 into a flexible conduit 401 which discharges into the catch basin 269.

*Bending roll supporting and drive means*

The means for mounting, adjusting, and driving the bending roll 47 is illustrated particularly in Figs. 1, 14 to 23, 30 and 31, and reference will now be had thereto. The bending roll is hung at each end from a horizontal slide 402 mounted upon the respective supporting beam 215, the portion 218 of said beam being provided as shown in Fig. 11 with spaced flat bearing surfaces 403 and 404 upon which the slide rests and along which it is movable to adjust the position of the bending roll as will be later explained. The portion 218 of the beam is also cut away at the front thereof as at 405 to accommodate the bending roll supporting means which will now be described.

The slide 402 is provided intermediate its ends with a forwardly facing vertical recess 406 within which is received the upper cylindrical portion 407 of a vertical hanger 408 carrying at its lower end a bearing housing 409 within which the adjacent end of the bending roll 47 is rotatably mounted. The hanger 408 passes upwardly through the opening 316 in the top of the enclosure 253 and is threaded at its upper end as at 410 to receive a nut 411 which rests upon the top of the slide and assists in supporting the bending roll. The nut or collar 411 also serves to vertically adjust the bending roll 47.

The slide 402 is provided with a vertically depending back plate 412 secured to the beam 215 by fastening elements 413 passing through horizontal slots 414 in said beam. The back plate 412 is formed intermediate its side edges with a vertical substantially V-shaped groove 415 and adapted to fit therein is the polygonal portion 416 of the hanger 408, said polygonal portion being welded at its lower end as at 417 to the top 418 of the bearing housing 409. Cooperating with the V-shaped portion 415 of the back plate 412 is a correspondingly V-shaped clamping plate 419 which is secured in place by screws 420 said screws passing through vertical bayonet slots 421 in the clamping plate and being threaded into the said back plate. The provision of the bayonet slots 421 permits the clamping plate 419 to be readily hung upon the screws 420, after which the said screws may be tightened to secure the clamping plate in position and firmly clamp the polygonal portion 416 of the hanger 408 between the said clamping plate and back plate. The clamping plate can be provided with a handle 422 to facilitate the hanging thereof upon the screws 420 and its removal therefrom when desired.

Arranged within each bearing housing 409 at opposite sides of the vertical centerline thereof and adjacent opposite ends of said housing are two pairs of rollers 423 and 424 (Fig. 18) upon which the adjacent end of the bending roll is rotatably supported, each of said rollers being carried by a stub shaft 425 (Fig. 19) journaled in the side walls of said housing.

The bending roll 47 is normally positively driven but is also provided with an overrunning clutch to permit the roll to be driven by the sheet at such time as the sheet may be traveling at a greater speed than the peripheral speed of said roll. Also, to permit the bending roll to be manually rotated at a relatively faster speed than that at which it is positively driven to effect the cleaning of said roll as will be later fully explained. The means for driving the bending roll includes, as shown in Fig. 1, a horizontal shaft 426 extending longitudinally of the machine at one side thereof and journaled in bearings 427 and 428, said bearing 428 being supported upon the supporting beam 215 at 429 (Fig. 11) while the bearing 427 is carried by a supporting bracket member 430 mounted upon a pedestal 431 carried by or formed integral with said supporting beam 215. Encircling the shaft 426 between bearings 427 and 428 is a tubular member 432 which protects the said shaft from the heat of the machine and acts as a guard to protect the workman from the moving parts.

The shaft 426 is driven from the shaft 236 (which drives the machine rolls 50) through a belt and a pulley drive designated in its entirety by the numeral 433. This drive includes a pulley 434 carried by the shaft 236 which extends through a bearing 435 secured to pedestal 431 and a Reeves variable speed pulley 436 carried by a shaft 437 connected to the drive shaft 426 by a flexible coupling 438. The shaft 437 is rotatably mounted in a bearing 439 (Figs. 30 and 31) which is formed as a part of a follower member 440 carried by the bracket member 430. The follower 440 is provided with a beveled vertical edge 441 received within an undercut groove 442 in the bracket number 430, while the opposite vertical edge of said follower is also beveled as at 443 and associated therewith is a correspondingly beveled strip 444 secured in place by screws or the like 445, said strip 444 cooperating with the undercut groove 442 to provide a guideway for the follower 440. The desired vertical adjustment of the follower 440 may be effected by an adjusting screw 446 threaded through an ear 447 formed on the follower and operated by a hand wheel 448. The adjusting screw 446 is provided at its upper end with a reduced smooth portion 449 which is journaled in a bearing 450 whereby the said screw is rotatable but held against vertical movement. Trained over the pulleys 434 and 436 on shafts 435 and 437 respectively is a belt 451. The belt and pulley drive 433 may be enclosed by a casing 452 if desired. As is well understood, a Reeves pulley such as pulley 436, is a split pulley, with the two parts being movable toward and away from one another to vary the speed of the drive shaft 426. For instance, upon upward vertical movement of the follower 440, the increased tension of the belt 451 will move the two parts of the pulley away from one another, thereby causing the loop of the belt 451 to move downwardly and so decrease the effective diameter of the pulley 436 which will automatically increase the speed of the shaft 426. Whereas, when the follower is lowered to ease the tension of the belt it will have the opposite effect and the speed of said shaft will be reduced. The two parts of the pulley are normally urged toward one another at all times by a compression spring 453 (Fig. 1).

The shaft 426 has secured thereto, beyond bearing 428, a tubular member 651 and slidably associated therewith is a flexible coupling 652 also connected to a shaft 653 journaled in the slide 402 as at 454 and 455 (Fig. 21). Keyed to the shaft 653 is a worm 456 meshing with a worm gear 457 which is carried by a vertical spindle 458. The spindle 458 projects vertically above and beneath the slide 402 (Fig. 14) and is operatively connected with the bending roll 47 to effect the positive driving thereof. More particularly, the worm gear 457 is keyed to a sleeve 459 which is loose on the spindle 458 and provided at its upper end with an annular series of ratchet teeth 460, said sleeve being mounted adjacent its lower ends in ball bearings 461 carried by the slide and adjacent its upper end in ball bearings 462 mounted in the lower end of a casing 463 which is secured upon the top of the slide 402. Slidably keyed to the spindle 458 within casing 463 is a second sleeve 464 provided at its lower end with a series of ratchet teeth 465 adapted to mesh with the series of ratchet teeth 460 at the upper end of sleeve 459. With this construction, it will be seen that upon rotation of the worm gear 457, the sleeve 459 will be driven therewith to effect rotation of the sleeve 464 through the intermeshing series of ratchet teeth 460 and 465 and consequently the rotation of the spindle 458 to which the sleeve 464 is keyed.

Secured to the lower end of the spindle 458 is a flexible coupling 466 having a socket 467 in its lower end which is adapted to fit loosely over the angular upper end 468 of a vertical stub shaft 469 which is journaled in the bearing housing 409 as at 470 and 471. Carried by the stub shaft 469 is a worm 472 adapted to mesh with a worm gear 473 encircling the bending roll 47 and by means of which the said roll is driven.

As shown particularly in Fig. 17, there is secured to each end of the bending roll 47 within the respective bearing housing 409 a sleeve 474 fixed thereto by one or more screws 475. Encircling the sleeve 474 at the driven end of the roll is a ring 476 secured thereto by screws 477 and provided with clutch teeth 478. Slidably mounted upon the sleeve 474, inwardly of ring 476 is a collar 479 provided at its outer end with rack teeth 480 adapted to mesh with the rack teeth 478 on ring 476. Encircling the collar 479 is a sleeve 481 upon which the worm gear 473 is keyed, said collar 479 being slidably associated with said sleeve 481 by the provision of keys 482. Upon rotation of the worm gear 473 to drive the sleeve 481, the collar 479 is also adapted to be driven but since the collar 479 is slidably keyed to the sleeve 481, the said collar can be moved horizontally relative to said sleeve to engage the clutch teeth 480 with the clutch teeth 478 or to disengage the same. When the teeth 478 and 480 are engaged with one another, it will be apparent that the bending roll will be positively driven. The sliding of the collar 479 to engage and disengage the teeth 478 and 480 may be effected in the following manner, with particular reference to Figs. 16, 17 and 20.

Fitting over the collar 479 is an inverted substantially U-shaped yoke 483, the legs of which are fulcrumed at their lower ends to the inner ends of pins 484 carried by the bearing housing 409 and pivoted intermediate their ends as at 485 to the collar 479 so that upon swinging of the yoke upon the fulcrum pins 484, the collar 479 can be moved horizontally upon sleeve 474 to engage or disengage the clutch teeth 478 and 480. Pivoted to the upper end of the yoke as at 486 is one end of a horizontal pull rod 487 passing outwardly through a housing 488 and carrying a plunger 489 formed at its outer end with a handle portion 490. The plunger 489 is received within the housing 488 and is provided with a recess 491 in which is arranged a compression spring 492, encircling the rod 487 and acting to normally urge said plunger outwardly. Also formed integral with the plunger 489 is a latch plate 493 which is adapted to cooperate with a plate 494 secured to the housing 488 by screws or the like 495. The plate 494 is provided with a slot 496 and when the latch plate 493 is in a horizontal position it can pass through the slot 496, and when the plunger 489 is drawn forwardly the yoke 483 will be actuated to move the teeth 480 on collar 479 in engagement with the teeth 478 on ring 476 thereby effecting the positive driving of the bending roll. When it is desired to disconnect the positive drive, the plunger 489 is forced inwardly against the action of the compression spring 492 which serves to slide the collar 479 along sleeve 474 to disengage the teeth 478 and 480. When the plunger 489 is forced inwardly and turned 90 degrees the latch plate 493 will be moved to the position shown in Fig. 20 and will engage the rear surface of the plate 494 to maintain the plunger in its inward position and the clutch teeth 478 and 480 out of mesh.

Although under normal operating conditions the teeth 478 and 480 are maintained in mesh with one another to effect positive driving of the bending roll 47, the said roll is preferably provided with an overrunning clutch arrangement which permits of its being driven by the glass sheet at a relatively higher speed than that at which it is normally positively driven if desired. The overrunning clutch arrangement comprises a series of ratchet teeth 497 formed on the sleeve 474 and with which are adapted to cooperate a plurality of dogs 498 (Fig. 16), said dogs being pivoted on transverse pins 499 and normally held in engagement with the ratchet teeth 497 by leaf springs 500. Arranged at opposite sides of the ratchet teeth 497 are roller bearings 501 and 502 (Fig. 17), the bearings 501 being held in place by a ring 503 secured to the end of the sleeve 481 by the pins 499 upon which the dogs 498 are mounted. Under normal operating conditions the bending roll will be positively driven as described above and in such case there will be no relative movement between the ratchet teeth on the sleeve 474 and the dogs 498. However, the overrunning clutch may be rendered effective by disengaging the teeth 478 and 480. In this case the roll can be driven by the sheet at a speed higher than that of the positive drive and the ratchet teeth on the sleeve 474 will pass freely beneath the dogs 498. Thus the bending roll will be driven by the friction of the glass sheet unless for some reason the speed of rotation of the roll falls below the speed of the positive drive whereupon the drive will be taken up by the dogs 498 engaging the ratchet teeth 497.

In order to effect the cleaning of the bending roll to remove particles or specks of dirt therefrom, means is provided to permit the manual spinning of the roll at a relatively higher speed than that at which it is positively driven and when this is done, any specks or particles of dirt upon the roll will be wiped therefrom due to the relative rotary movement between the roll and sheet. To accomplish this, it is preferred that means be employed to first disconnect the positive drive of the bending roll and this is accomplished by disengaging the intermeshing ratchet teeth 460 and 465 by raising the spindle 458. When this is done, the spindle 458 can be turned more rapidly by the operator by means of a hand wheel 505 keyed to the upper end of said spindle. The raising of the spindle to disengage the ratchet teeth 460 and 465 is effected by the following apparatus.

Passing horizontally through and rotatably carried by the extension 506 of casing 463 is a rocker shaft 507 and fixed to this shaft within the extension is a yoke 508, the ends 509 and 510 of which straddle the spindle 458 and carry rollers 511 (Fig. 21) which are received within openings in the sleeve 464 so that upon rocking of the shaft 507, the said sleeve can be raised to disengage the ratchet teeth 460 and 465. Also carried by the rocker shaft 507 outwardly of the extension and at each end thereof is an arm 512 provided at its outer end with a bearing 513 in which is slidably mounted a pin 514. This pin passes through the outer end wall 515 of the bearing and also through the outer end of a cap 516, being secured thereto by a nut 517. The cap 516 is slidable over the outer end of the bearing 513 and encircling the pin 514 within said bearing is a compression spring 518 bearing at one end against the end wall 515 of said bearing and at its opposite end against a collar 504 on said pin, said spring normally urging the said pin inwardly for selective engagement within openings 519 or 520 (Fig. 14) formed in a vertical plate 609 secured to the slide 402 (Fig. 1). When it is desired to raise the spindle 458, the operator swings the arms 512 upwardly and engages the pins 514 within the openings 519. This vertical movement of the spindle will be sufficient to disengage the ratchet teeth 460 and 465 to break the positive drive to the bending roll and thereby permit manual spinning thereof, but will not be sufficient to disengage the socket 467 of the coupling 466 from the upper end 468 of stub shaft 469. When, however, it is desired to remove the bending roll or to make repairs thereto, the spindle 458 can be raised until the coupling 466 is disengaged from the stub shaft 469, at which time the pins 514 will be received within the upper openings 520 in plates 609.

For the purpose of facilitating the horizontal adjustment of the slides 402 to properly position the bending roll 47, each of said slides is provided upon the under-surface thereof with a rack bar 521 and meshing therewith is a spur gear 522 fixed to a shaft 523 rotatably mounted in the supporting beam 215. To facilitate the turning of the shaft 523, the outer end thereof may be formed with a wrench or other tool receiving portion 525 (Fig. 22). In order to indicate the horizontal position of the bending roll, there may be carried by each of the supporting beams 215 a scale 526, and by the slide 402 a pointer 527 cooperating with said scale. Likewise, in order to determine the vertical position of the bending roll, a scale 528 may be carried by each of the slides 402 and positioned behind the hangers 408; the upper ends of said hangers cooperating with the scales to indicate the vertical position of the roll.

The bearing housings 409 are adapted to be internally cooled and for this purpose each housing is provided with a series of annular chambers 529, 530, 531 and 532 (Fig. 17), said chambers being connected with one another by suitable cross passages. The water for cooling may be introduced into the housing through a pipe 533 (Fig. 15) and flows downwardly through a passage 534 and cross passage 535 into the chamber 529 and, after circulating through the chambers 529, 530, 531 and 532 passes from said housing through an outlet pipe 536.

The bending roll 47 is adapted to be internally cooled preferably by the continuous circulation of air therethrough which may be introduced into the opposite ends of said roll and also discharged from the opposite ends thereof. For this purpose, there is arranged concentrically within the bending roll a perforated pipe 537 projecting beyond the roll at the opposite ends thereof. With reference particularly to Figs. 24 and 25, there is attached to each end of the pipe 537 by means of a coupling 538, a vertical extension 539 extending upwardly through the opening 317 in the top 313 of enclosure 253. The cooling air is fed into the opposite ends of the pipe 537 through the extensions 539 and is discharged through perforations therein into the bending roll 47: the spent air passing freely outwardly of the opposite ends of said roll. This spent air is received within the L-shaped casings 540 and discharged therefrom into the atmosphere. Each casing 540 includes a horizontal section 541 which fits over the outer end of the sleeve 474 and a vertical section 542 extending up through the opening 317 in the top of the enclosure and held in position with respect to the extension 539 by horizontal set screws 543. The angular meeting ends of the sections 540 and 541 are provided with flanges 544 and 545 respectively secured together by screws 546 and wing nuts 547 threaded thereon. The screws 546 are pivoted to the section 541 as at 391 and are received in aligned open slots 392 formed in the meeting flanges 544 and 545. The section 542 is provided at its lower end with an opening 604 in which is inserted a window 548 comprising a transparent glass plate.

To further maintain the casing 540 in proper position, the section 541 is provided at its opposite sides with horizontal sleeves 549 for receiving therein the outer end portions of trunnions 550 which are threaded in the stub shafts 425, as indicated at 551 (Fig. 19). Each trunnion 550 is provided with an annular groove 552 for receiving a set screw 553 passing through the respective sleeve 549, whereby the section 541 is firmly attached to the trunnions 550.

The idler roll 48 may be mounted and driven in substantially the same manner as the bending roll 47 and therefore a detailed description of the mounting and drive shown in Fig. 26 is not thought to be necessary. However, it is pertinent to note that the said roll is driven from the line shaft 236 through a worm 554 meshing with a worm gear 555 carried by said roll. This roll may also have associated therewith an overrunning clutch in the same manner as the bending roll.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In a sheet glass forming machine of the character described, wherein the sheet is drawn continuously upwardly from a bath of molten glass and while still in a semi-plastic condition, although substantially set in its final sheet form, is deflected into the horizontal plane and passed horizontally through a drawing and flattening zone into an annealing zone, a frame arranged at each side of the drawing and flattening zone and serving to partially enclose the same, additional enclosure means arranged outwardly of said frames and cooperating therewith to completely enclose the opposite sides of said drawing and flattening zone, a bending roll over which the sheet is deflected from the vertical plane into the horizontal plane, a bearing housing within said enclosure means at each side of the machine for rotatably supporting the adjacent end of said bending roll, a hanger for each bearing housing extending upwardly through the top of the respective enclosure means, and separate means mounted above the said enclosure means for supporting each hanger.

2. In a sheet glass forming machine of the character described, wherein the sheet is drawn continuously upwardly from a bath of molten glass and while still in a semi-plastic condition, although substantially set in its final sheet form, is deflected into the horizontal plane and passed horizontally through a drawing and flattening zone into an annealing zone, a frame arranged at each side of the drawing and flattening zone and serving to partially enclose the same, additional enclosure means arranged outwardly of said frames and cooperating therewith to completely enclose the opposite sides of said drawing and flattening zone, a bending roll over which the sheet is deflected from the vertical plane into the horizontal plane, a bearing housing within said enclosure means at each side of the machine for rotatably supporting the adjacent end of said bending roll, a hanger for each bearing housing extending upwardly through the top of the respective enclosure means, separate means mounted above the said enclosure means for supporting each hanger, and means for adjusting the said hanger supporting means horizontally.

3. In a sheet glass forming machine of the character described, wherein the sheet is drawn continuously upwardly from a bath of molten glass and while still in a semi-plastic condition, although substantially set in its final sheet form, is deflected into the horizontal plane and passed horizontally through a drawing and flattening zone into an annealing zone, a frame arranged at each side of the drawing and flattening zone and serving to partially enclose the same, additional enclosure means arranged outwardly of said frames and cooperating therewith to completely enclose the opposite sides of said drawing and flattening zone, a bending roll over which the sheet is deflected from the vertical plane into the horizontal plane, a bearing housing within said enclosure means at each side of the machine for rotatably supporting the adjacent end of said bending roll, a hanger for each bearing housing extending upwardly through the top of the respective enclosure means, separate means mounted above the said enclosure means for supporting each hanger, and means for adjusting the said hanger vertically to raise and lower the bending roll.

4. In a sheet glass forming machine of the character described, wherein the sheet is drawn continuously upwardly from a bath of molten glass and while still in a semi-plastic condition, although substantially set in its final sheet form, is deflected into the horizontal plane and passed horizontally through a drawing and flattening zone into an annealing zone, a frame arranged at each side of the drawing and flattening zone and serving to partially enclose the same, additional enclosure means arranged outwardly of said frames and cooperating therewith to completely enclose the opposite sides of said drawing and flattening zone, a bending roll over which the sheet is deflected from the vertical plane into the horizontal plane, a bearing housing within said enclosure means at each side of the machine for rotatably supporting the adjacent end of said bending roll, a hanger for each bearing housing extending upwardly through the top of the respective enclosure means, separate means mounted above the said enclosure means for adjusting the said hanger supporting means horizontally, and means for adjusting the said hanger vertically relative to said supporting means to raise and lower the bending roll.

5. In a sheet glass forming machine of the character described, wherein the sheet is drawn continuously upwardly from a bath of molten glass and while still in a semi-plastic condition, although substantially set in its final sheet form, is deflected into the horizontal plane and passed horizontally through a drawing and flattening zone into an annealing zone, a frame arranged at each side of the drawing and flattening zone and serving to partially enclose the same, additional enclosure means arranged outwardly of said frames and cooperating therewith to completely enclose the opposite sides of said drawing and flattening zone, said last-named enclosure means including a bottom member, side, top, and front walls, chambers formed in said bottom member for gas, air and water, connections leading from said chambers into the said enclosure means for supplying the gas, air and water to the desired parts of the machine, and means arranged exteriorly of the enclosure means for controlling the supply of gas, air and water.

6. In a sheet glass forming machine of the character described, a working receptacle containing a bath of molten glass, means for drawing a continuous sheet upwardly therefrom, a bending roll over which the sheet is deflected from the vertical plane into the horizontal plane, a positive drive for the bending roll, an over-running clutch connecting the positive drive with said bending roll and permitting the bending roll to turn at a faster speed than that at which it is positively driven, and a manually operable clutch for connecting the positive drive directly with the said bending roll and for disconnecting the same therefrom to render said overrunning clutch effective.

7. In a sheet glass forming machine of the character described, wherein the sheet is drawn continuously upwardly from a bath of molten glass and while still in a semi-plastic condition, although substantially set in its final sheet form, is deflected into the horizontal plane and passed horizontally through a drawing and flattening zone into an annealing zone, a frame arranged at each side of the drawing and flattening zone and serving to partially enclose the same, additional enclosure means arranged outwardly of said frames and cooperating therewith to completely enclose the opposite sides of said drawing and flattening zone, a bending roll over which the sheet is deflected from the vertical plane into the horizontal plane, means arranged within said enclosure means for supporting the bending roll at its opposite ends, a perforated pipe extending through said bending roll and having vertical end portions beyond said roll extending upwardly through the top of the enclosure means and adapted to receive a cooling medium, and a cylindrical member surrounding each end of the bending roll and also the respective end portion of each pipe and being spaced therefrom to receive the exhaust cooling medium from the said bending roll and discharge it exteriorly of said enclosure means.

8. In a sheet glass forming machine of the character described, a bending roll over which the sheet may be deflected from one plane to another plane, a drive shaft, means driven by said drive shaft and operatively connected with said bending roll for driving the same, said last named means including a vertical stub shaft, a vertical spindle above and in substantial alignment with said stub shaft and a coupling member carried at the lower end of said spindle and having a socket loosely receiving the upper end of said stub shaft therein, and means for raising said spindle to disengage said coupling member from said stub shaft when it is desired to remove said bending roll.

9. In a sheet glass forming machine of the character described, a bending roll over which the sheet may be deflected from one plane to another plane, a drive shaft, means driven by said drive shaft and operatively connected with said bending roll for driving the same, said last named means including a vertical spindle, a sleeve loosely mounted on said spindle and having a series of ratchet teeth at its upper end, a second sleeve keyed to the said spindle above said first sleeve and having a series of ratchet teeth at its lower end in normal engagement with the first series of ratchet teeth, and means manually operable to raise said spindle to disengage said first and second series of ratchet teeth and to maintain the spindle in raised position thereby disconnecting the positive drive to the bending roll.

10. In a sheet glass forming machine of the character described, a bending roll over which the sheet may be deflected from one plane to another plane, a drive shaft, means driven by said drive shaft and operatively connected with said bending roll for driving the same, said means including a vertical stub shaft, a vertical spindle above and in substantial alignment with said stub shaft and a coupling member carried at the lower end of said spindle and having a socket loosely receiving the upper end of said stub shaft therein, a sleeve loosely mounted on said spindle and having a series of ratchet teeth at its upper end, a second sleeve keyed to the said spindle above said first sleeve and having a series of ratchet teeth at its lower end in normal engagement with said first series of ratchet teeth, means manually operable to raise the spindle to one position to disengage said first and second series of ratchet teeth thereby disconnecting the positive drive to the bending roll while maintaining said coupling member in engagement with said stub shaft, or to a second position to disengage said coupling member from said stub shaft when it is desired to remove said bending roll, and means for maintaining said spindle in either of its raised positions.

JOHN L. DRAKE.
GEORGE R. ROESCH.